(12) United States Patent
Saeki et al.

(10) Patent No.: US 9,086,116 B2
(45) Date of Patent: Jul. 21, 2015

(54) DAMPER DEVICE

(75) Inventors: Tomohiro Saeki, Anjo (JP); Satoshi Nakagaito, Kariya (JP); Hiroaki Suezaki, Anjo (JP); Yuki Miyamoto, Kariya (JP)

(73) Assignee: AISIN SEIKI KABUSHIKI KAISHA, Kariya-shi, Aichi (JP)

( * ) Notice: Subject to any disclaimer, the term of this patent is extended or adjusted under 35 U.S.C. 154(b) by 115 days.

(21) Appl. No.: 13/813,050

(22) PCT Filed: Jul. 28, 2011

(86) PCT No.: PCT/JP2011/067280
§ 371 (c)(1),
(2), (4) Date: Jan. 29, 2013

(87) PCT Pub. No.: WO2012/017917
PCT Pub. Date: Feb. 9, 2012

(65) Prior Publication Data
US 2013/0125700 A1 May 23, 2013

(30) Foreign Application Priority Data

Aug. 6, 2010 (JP) ................. 2010-177924

(51) Int. Cl.
*F16F 15/12* (2006.01)
*F16F 15/315* (2006.01)
*F16F 15/139* (2006.01)
*B60K 6/445* (2007.10)
*F16D 1/10* (2006.01)
*F16D 3/14* (2006.01)

(52) U.S. Cl.
CPC ......... *F16F 15/3153* (2013.01); *F16F 15/1395* (2013.01); *B60K 6/445* (2013.01); *B60Y 2400/48* (2013.01); *F16D 1/10* (2013.01); *F16D 3/14* (2013.01); *F16D 2001/103* (2013.01); *Y02T 10/6239* (2013.01); *Y10T 74/2121* (2015.01)

(58) Field of Classification Search
USPC ........ 74/433.5, 572.2, 573.12, 573.13, 574.3, 74/574.4
See application file for complete search history.

(56) References Cited

U.S. PATENT DOCUMENTS 2,745,268 A * 5/1956 Reed ............................ 464/68.4
3,800,931 A * 4/1974 Maucher .................. 192/213.11
(Continued)

FOREIGN PATENT DOCUMENTS

JP        2-062410 A     3/1990
JP     2001-003947 A     1/2001
(Continued)

OTHER PUBLICATIONS

International Search Report (PCT/ISA/210) issued on Nov. 1, 2011, by the Japanese Patent Office as the International Searching Authority for International Application No. PCT/JP2011/067280.

*Primary Examiner* — Vicky Johnson
(74) *Attorney, Agent, or Firm* — Buchanan Ingersoll & Rooney PC

(57) ABSTRACT

A damper device comprises: a first shaft that outputs rotational power from a power source; a second shaft that transmits rotational power to a gear mechanism and has outer splines; a first rotational member(s) to which the rotational power of the first shaft is transmitted; a second rotational member spline-engaged with the outer splines; a damper unit that absorbs torque fluctuation between the first and second rotational members; and an inertial body having inner splines spline-engaged with the outer splines and having an annular portion. The tooth parts of the inner splines are pressed into contact with the tooth parts of the outer splines in the circumferential direction of the inertial body.

18 Claims, 17 Drawing Sheets

(56) References Cited

U.S. PATENT DOCUMENTS

| | | | | |
|---|---|---|---|---|
| 4,024,938 A | * | 5/1977 | Maucher | 192/213.12 |
| 4,605,114 A | * | 8/1986 | Goetz et al. | 192/213.1 |
| 5,045,027 A | * | 9/1991 | Larsen | 464/63.1 |
| 2005/0252745 A1 | * | 11/2005 | Vanselous et al. | 192/48.8 |

FOREIGN PATENT DOCUMENTS

| | | |
|---|---|---|
| JP | 2002-013547 A | 1/2002 |
| JP | 2009-292477 A | 12/2009 |

* cited by examiner

FIG.2 (EXAMPLE 1)

FIG.5 (EXAMPLE 1)

FIG.6 (EXAMPLE 2)

FIG.8 (EXAMPLE 2)

FIG.9  (EXAMPLE 2)

FIG.10 (EXAMPLE 3)

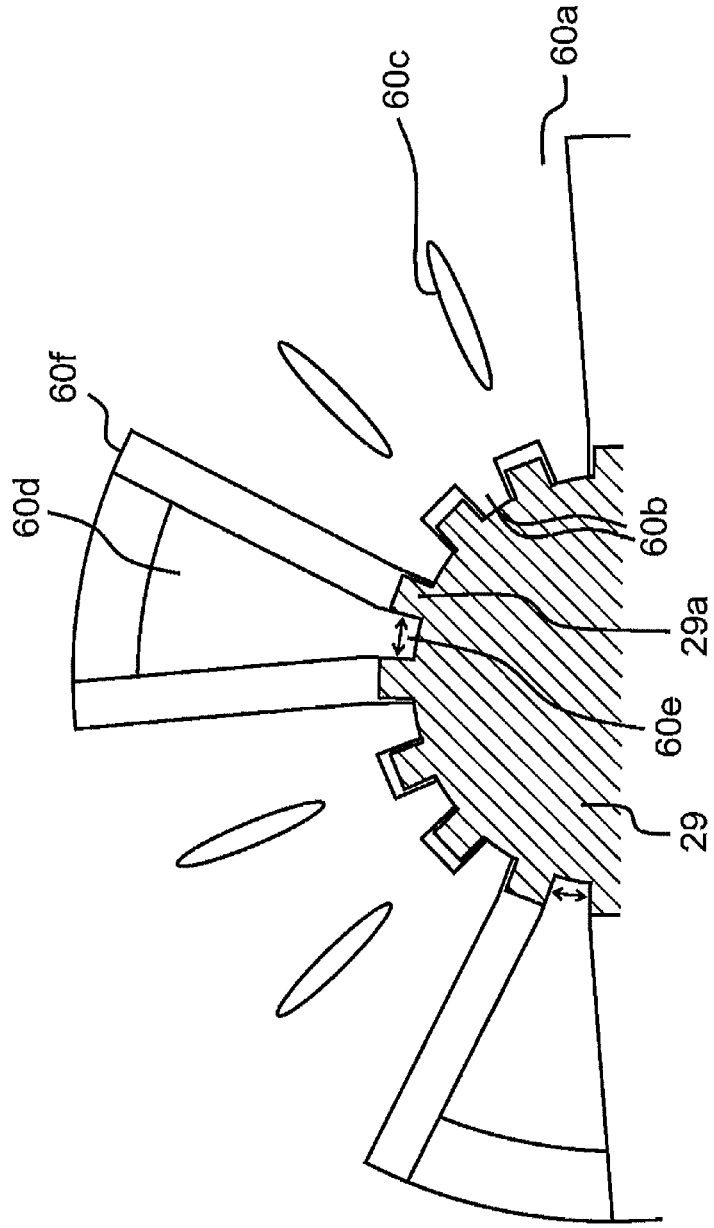
FIG.12 (EXAMPLE 3)

FIG.13 (EXAMPLE 4)
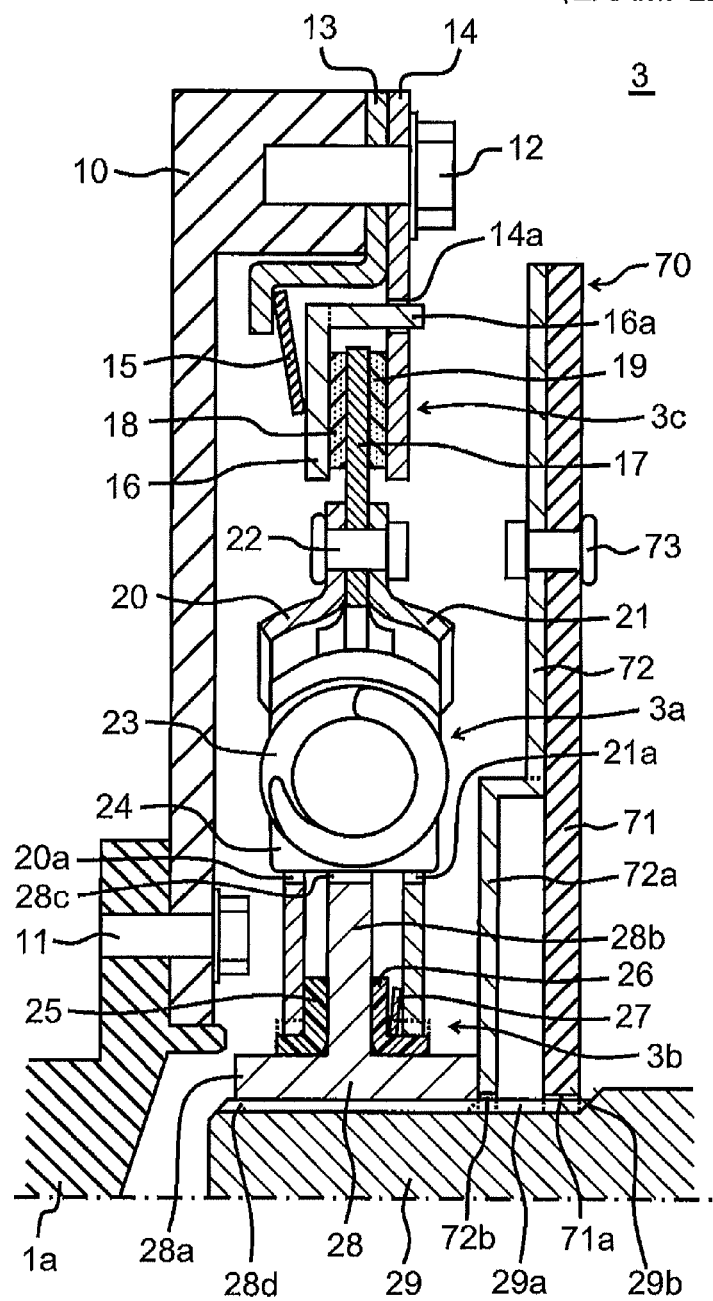

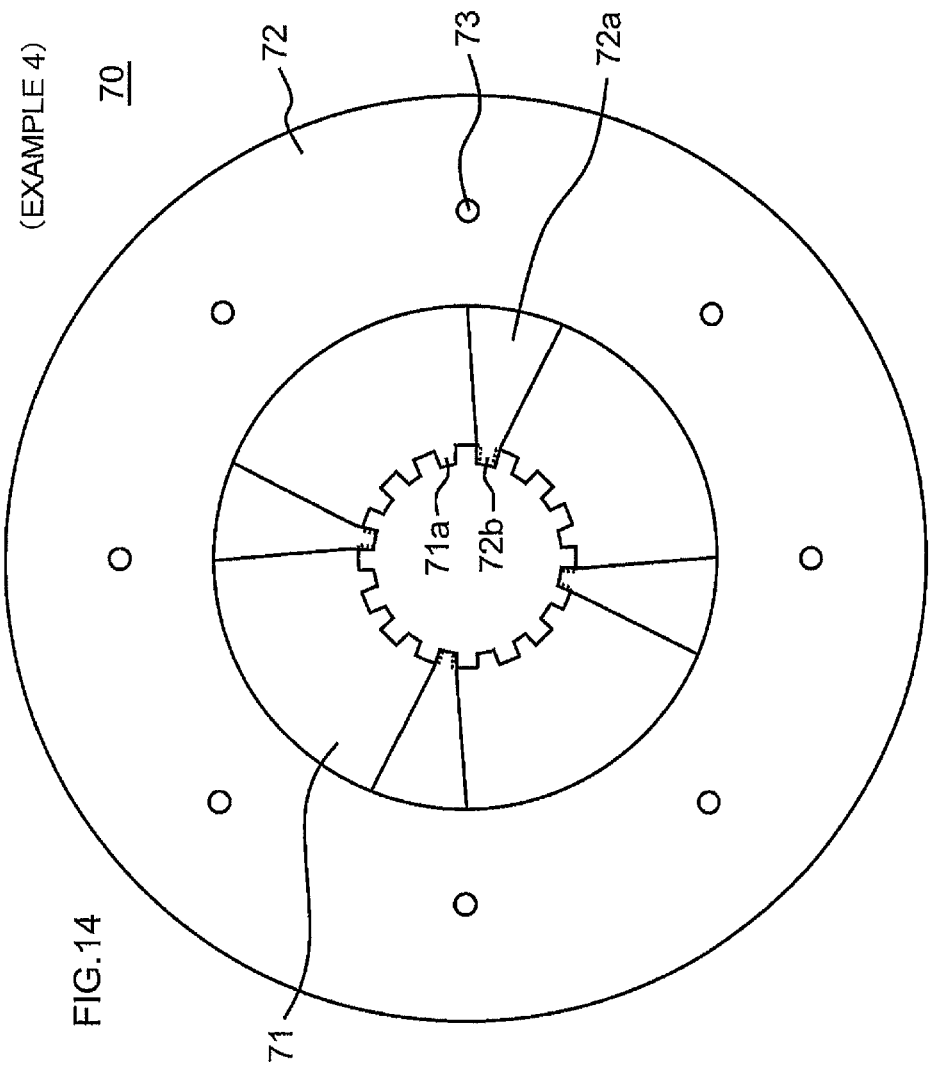

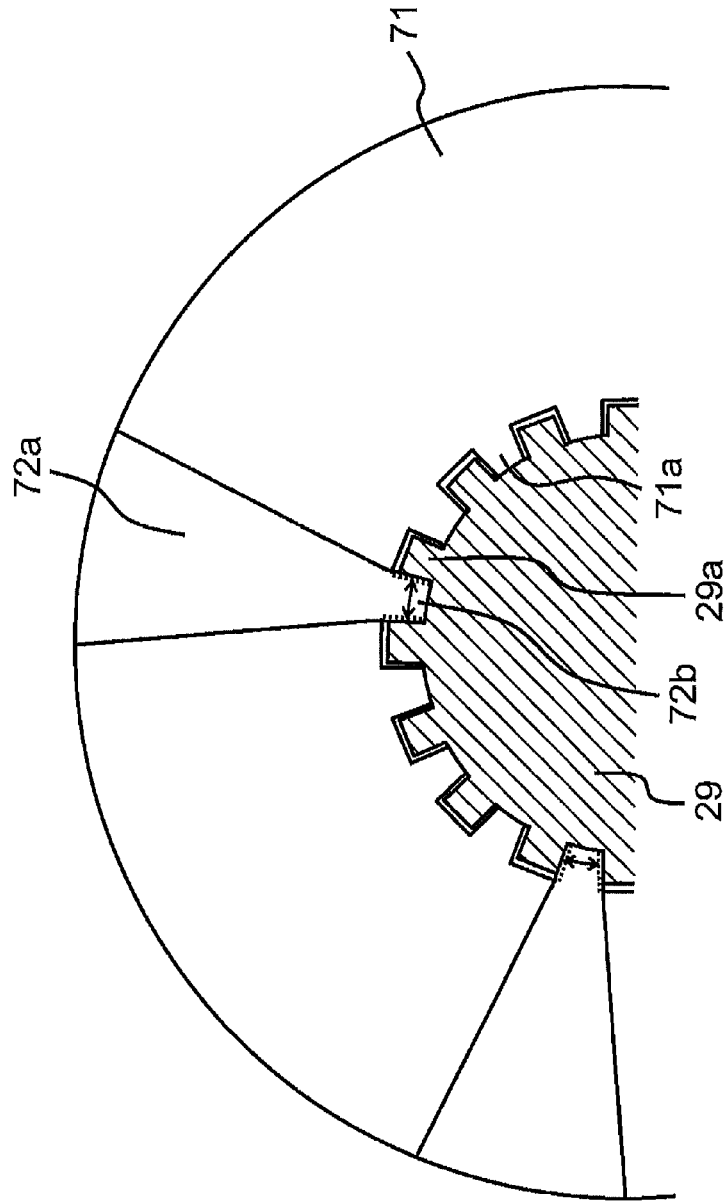
FIG.15 (EXAMPLE 4)

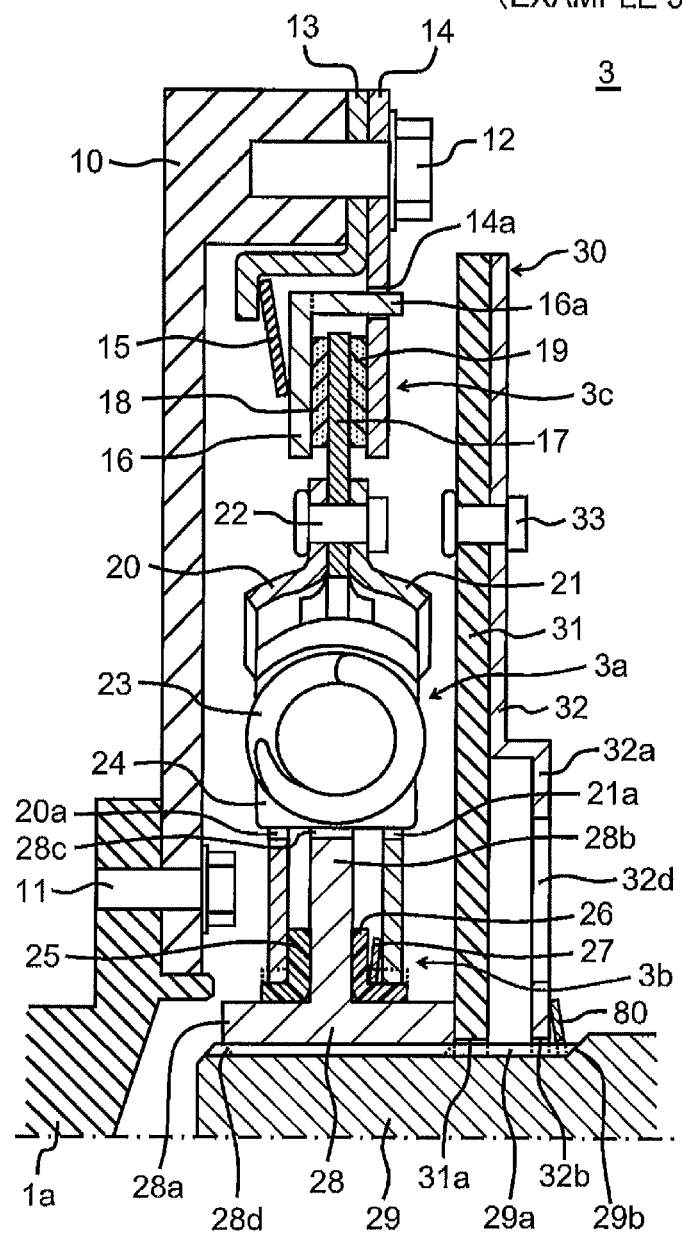
FIG.16 (EXAMPLE 5)

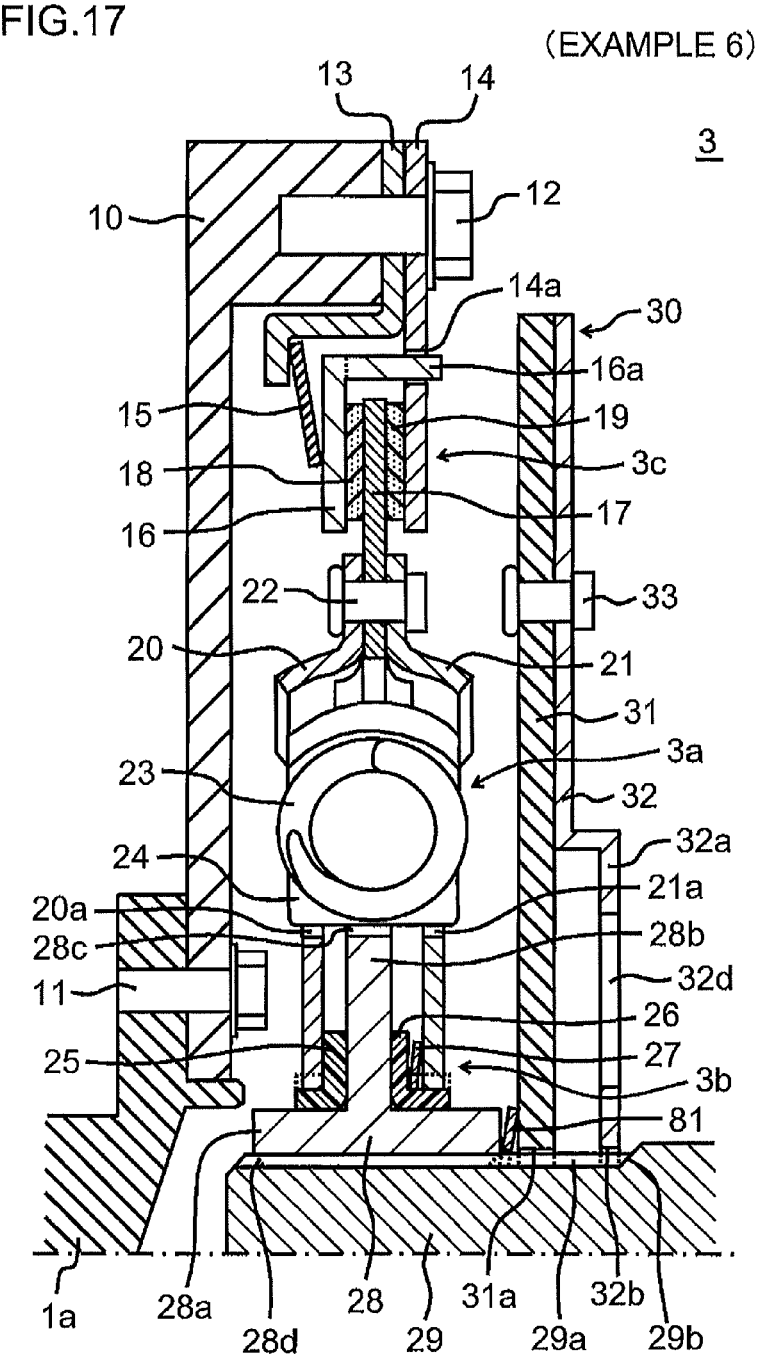
FIG.17 (EXAMPLE 6)

DAMPER DEVICE

CROSS-REFERENCE TO RELATED APPLICATION

This invention claims priority rights based on to the JP patent Application 2010-177924 filed in Japan on Aug. 6, 2010. The entire contents of this JP Patent Application are to be incorporated therein by reference thereto.

TECHNICAL FIELD

This invention relates to a damper device that absorbs torque fluctuations between two shafts and, more particularly, to a damper device having an inertial body is connected thereto.

BACKGROUND ART

A damper device is disposed on, for example, a path of motive power transmission between an engine and a speed-change transmission, in order to absorb (or suppress) torque fluctuations caused by the engine and the speed-change transmission. Among others there is a damper device including a damper unit that absorbs the torque fluctuations under a spring force, a hysteresis unit that absorbs (or suppresses) the torque fluctuations by the hysteresis torque caused by friction or the like, and a limiter unit that produces slip when torsion of a rotational shaft can no longer be absorbed by the damper unit or the hysteresis unit. In a motive power transmission system, having such damper device, chattering noise caused by gears in the speed-change transmission is produced due to engine vibrations. In particular, if, in a motive power transmission device loaded on a hybrid vehicle provided with an engine and an electric motor as motive power sources, an input shaft of the speed-change transmission is coupled via a planetary gear mechanism to the electric motor, which may also be a motor-generator, severe gear chattering may be produced in the speed-change transmission as a result of engine vibrations. To suppress such gear chattering from occurring, there is known a damper device of the type in which an inertial body is connected to the damper device on the motive power transmission path between the engine and the motive power transmission.

Patent Literature 1, for example, discloses a damper for a hybrid driving apparatus in which torque fluctuations produced by first and second power supply sources are suppressed in transmitting the torque. The damper includes a first rotational member driven in rotation by the first power supply source, and a second rotational member coupled to the second power supply source via a planetary gear mechanism. The damper also includes a torsion member that suppresses torque fluctuations between the first and second rotational members and a limiter mechanism that interrupts the transmission of the motive power from the first rotational member to the second rotational member when the torque fluctuations between the first and second rotational members have reached a pre-set value. The damper further includes an inertial body provided on the first rotational member or on the second rotational member. In FIG. 7 of Patent Literature 1, the second rotational member is coupled to a carrier shaft of the planetary gear mechanism. The inertial body has its inner rim part coupled by splined engagement to the carrier shaft, so that the inertial body is non-rotatable relative to the carrier shaft while being displaceable in the axial direction. Elastic member(s) of rubber or synthetic resin is provided in an axial gap formed between the inertial body and the second rotational member and in an axial gap formed between the inertial body and the carrier shaft.

Patent literature 1: JP Patent Kokai JP-A-2002-13547 (FIG. 7)

SUMMARY

The entirety of the contents disclosed in the above Patent Literature 1 is to be incorporated herein by reference thereto. The following analysis is given by the present invention.

In the arrangement of FIG. 7 of Patent Literature 1, an inertial body and a carrier shaft are coupled together by splined engagement, so that rattling occurs on the site of the splined engagement. Such rattling leads to vibrations to cause chattering noises on the site of the splined engagement or at the gears of the planetary gear mechanism.

Moreover, in the configuration of FIG. 7 of Patent Literature 1, the elastic material used in padding to preclude clearance (or play) of the inertial body in the axial direction is formed of rubber or synthetic resin. Hence, the elastic member tends to be deteriorated due to heat or the like so that its function in padding to preclude axial clearance tends to be impaired. In addition, since the inertial body and the elastic member are separate members, the problem of costs may be raised.

It is a first object of the present invention to provide a damper device in which it is possible to preclude clearance at the splined connection between the inertial body and the shaft.

It is a second object of the present invention to provide a damper device in which it is possible to maintain the function of axially positioning the inertial body in a stable state.

In one aspect of the present invention there is provided a damper device comprising: a first shaft that outputs rotational power of a power source; a second shaft that transmits the rotational power to a gear mechanism and includes outer splines, a first rotational member(s) to which the rotational power of the first shaft is transmitted; a second rotational member connected by splined engagement to the outer splines; a damper unit that absorbs torque fluctuations between the first rotational member(s) and the second rotational member; and an inertial body having inner splines for connection by splined engagement with the outer splines and having a substantially annular portion. Tooth parts of one of the outer splines and the inner splines are pressure-contacted with tooth parts of the other parts of the inner splines and the outer splines, in a circumferential direction of the inertial body.

In the above damper device, according to the present invention, preferably the inertial body (entity) includes, as the inner splines, first inner splines connected by splined engagement with the outer splines and second inner splines connected by splined engagement with the outer splines at a location spaced a pre-set distance from the first inner splines in an axial direction of the second shaft. The tooth parts of the first inner splines are phase-shifted relative to the tooth parts of the second inner splines. The tooth parts of the outer splines are pressure-contacted with the tooth parts of the first inner splines and the tooth parts of the second inner splines in the circumferential direction of the inertial body.

In the above damper device, according to the present invention, preferably the inertial body includes, as the inner splines, first inner splines connected by splined engagement with the outer splines and second inner splines press-fitted to the outer splines at a location spaced a pre-set distance from the first inner splines in the axial direction of the second shaft.

The tooth parts of the second inner splines are pressure-contacted with the tooth parts of the outer splines in the circumferential direction of the inertial body.

In the above damper device, according to the present invention, preferably the inertial body includes a first plate extending from the annular portion towards an inner rim part and having the first inner splines at an inner rim end thereof, a second plate extending from the annular portion towards the inner rim part and having the second inner splines at the inner rim end, and a rivet that connects the first and second plates together.

In the above damper device, according to the present invention, preferably at least one out of the first and second plates is formed by a plate member and includes a plurality of slits.

In the above damper device, according to the present invention, preferably the inertial body is formed by a single member and includes a first inner rim extension and a second inner rim extension extending from the inner rim end of the annular portion. The first inner rim extension includes the first inner splines at an inner rim end thereof, and the second inner rim extension includes the second inner splines at an inner rim end thereof.

In the above damper device, according to the present invention, preferably the inertial body includes radially extending slits. The slits are disposed circumferentially between the first and second inner rim extensions.

In the above damper device, according to the present invention, preferably at least one out of the first inner rim extension and the second inner rim extension includes a plurality of radially extending second slits.

In the above damper device, according to the present invention, preferably the second inner splines are disposed closer to the foremost part of the second shaft than are the first inner splines.

In the above damper device, according to the present invention, preferably the second shaft has a stepped sidewall section at retracted ends of the outer splines. One of the first inner splines and the second inner splines is pressure-contacted with the stepped sidewall section, while the other of the second inner splines and the first inner splines is pressure-contacted with the second rotational member.

In the above damper device, according to the present invention, preferably the second shaft has a stepped sidewall section at retracted ends of the outer splines. The damper device further includes: a resilient member of metal disposed between one of the first inner splines and the second inner splines and the stepped sidewall section. The resilient member biases the one of the first inner splines and the second inner splines towards the second rotational member. The other one of the first inner splines and the second inner splines are pressure-contacted with the second rotational member.

In the above damper device, according to the present invention, preferably the second shaft has a stepped sidewall section at retracted ends of the outer splines. The damper device further includes: a resilient member of metal disposed between one of the first inner splines and the second inner splines and the second rotational member. The resilient member biases one of the first inner splines and the second inner splines towards the stepped sidewall section. The other one of the first inner splines and the second inner splines are pressure-contacted with the stepped sidewall section.

According to the present invention (claims 1 to 12), the tooth parts of one of the outer splines of the second shaft and the inner splines of the inertial body are set so as to clamp the tooth parts of the other one of the splines from both sides thereof along the circumferential direction. It is thus possible to suppress the circumferential rattling of the inertial body relative to the second shaft as well as to suppress occurrence of chattering in the gear mechanism.

According to the present invention (claims 10 to 12), in which the inertial body is clamped between the stepped sidewall section of the second shaft and the second rotational member, it becomes possible to suppress the rattling in the axial direction of the inertial body relative to the second shaft. Hence, the rattling of the inertial body relative to the second shaft may be suppressed to realize positioning the inertial body.

BRIEF DESCRIPTION OF DRAWINGS

FIG. 12 is a schematic view showing the state of engagement between an inertial body and a shaft of the damper device according to Example 3 of the present invention, FIG. 13 is a radial partial cross-sectional view schematically showing the configuration of a damper device according to Example 4 of the present invention, FIG. 14 is a plan view, looking along the axial direction, schematically showing a configuration of an inertial body of the damper device according to Example 4 of the present invention, FIG. 15 is a schematic view showing the state of engagement between the inertial body and a shaft of the damper device according to Example 4 of the present invention, FIG. 16 is a radial partial cross-sectional view schematically showing the configuration of a damper device according to Example 5 of the present invention, and FIG. 17 is a radial partial cross-sectional view schematically showing the configuration of a damper device according to Example 6 of the present invention.

MODES

Figure 1:
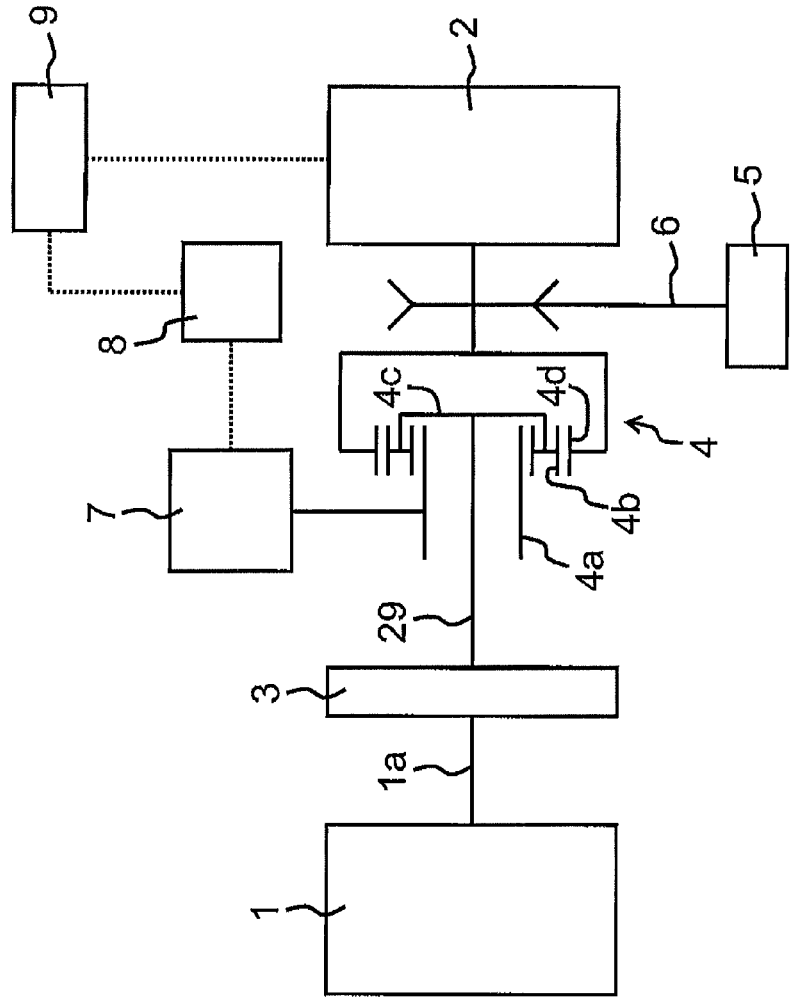
FIG. 1 is a schematic view showing a configuration of a hybrid driving device having a damper device according to Example 1 of the present invention.

A damper device according to an exemplary embodiment of the present invention includes a first shaft (1a of FIGS. 1 and 2) that outputs rotational power of a motive power source (1 of FIG. 1), a second shaft (29 of FIGS. 1 and 2) that transmits the rotational power to a gear mechanism (4 of FIG. 1) and that includes outer splines (29a of FIG. 2, i.e., radially outwardly directed splines), first rotational members (20, 21 of FIG. 2) the rotational power of the first shaft is transmitted to, a second rotational member (28 of FIG. 2) connected by splined engagement with the outer splines, a damper unit (3a of FIG. 2) that absorbs torque fluctuations between the first rotational members and the second rotational member, and an inertial body (30 of FIG. 2) having inner splines (31a, 32b of FIG. 2, i.e., radially inwardly directed splines) for connection by splined engagement to the outer splines and having a substantially annular portion. Tooth parts of one of the outer splines and the inner splines (31a, 32b in FIG. 2) is pressure-contacted with tooth parts of the other of the outer splines of the inner splines (29a of FIG. 2), in the circumferential direction of the inertial body.

It is observed that symbols for reference to the drawings, if used, are mainly for assisting in the understanding and are not intended for limiting to the modes illustrated.

Example 1

Figure 2:
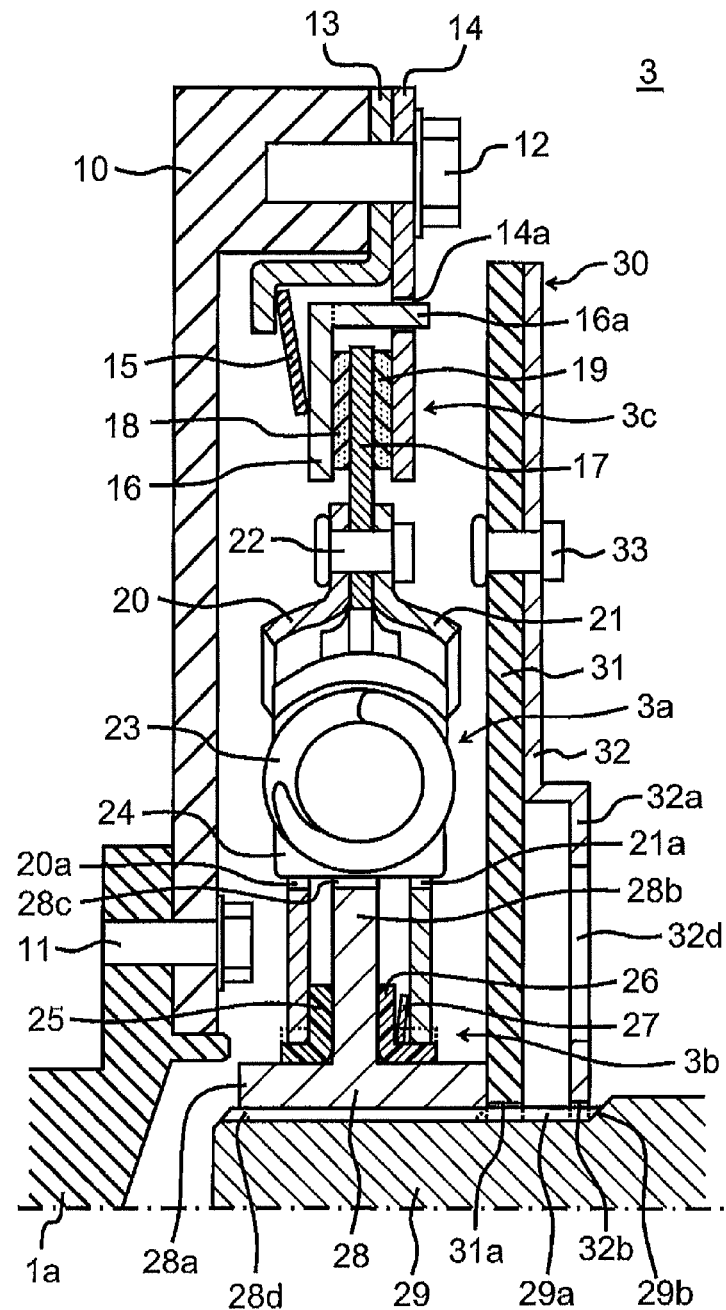
FIG. 2 is a radial partial cross-sectional view schematically showing a configuration of the damper device according to Example 1 of the present invention.
Figure 3:
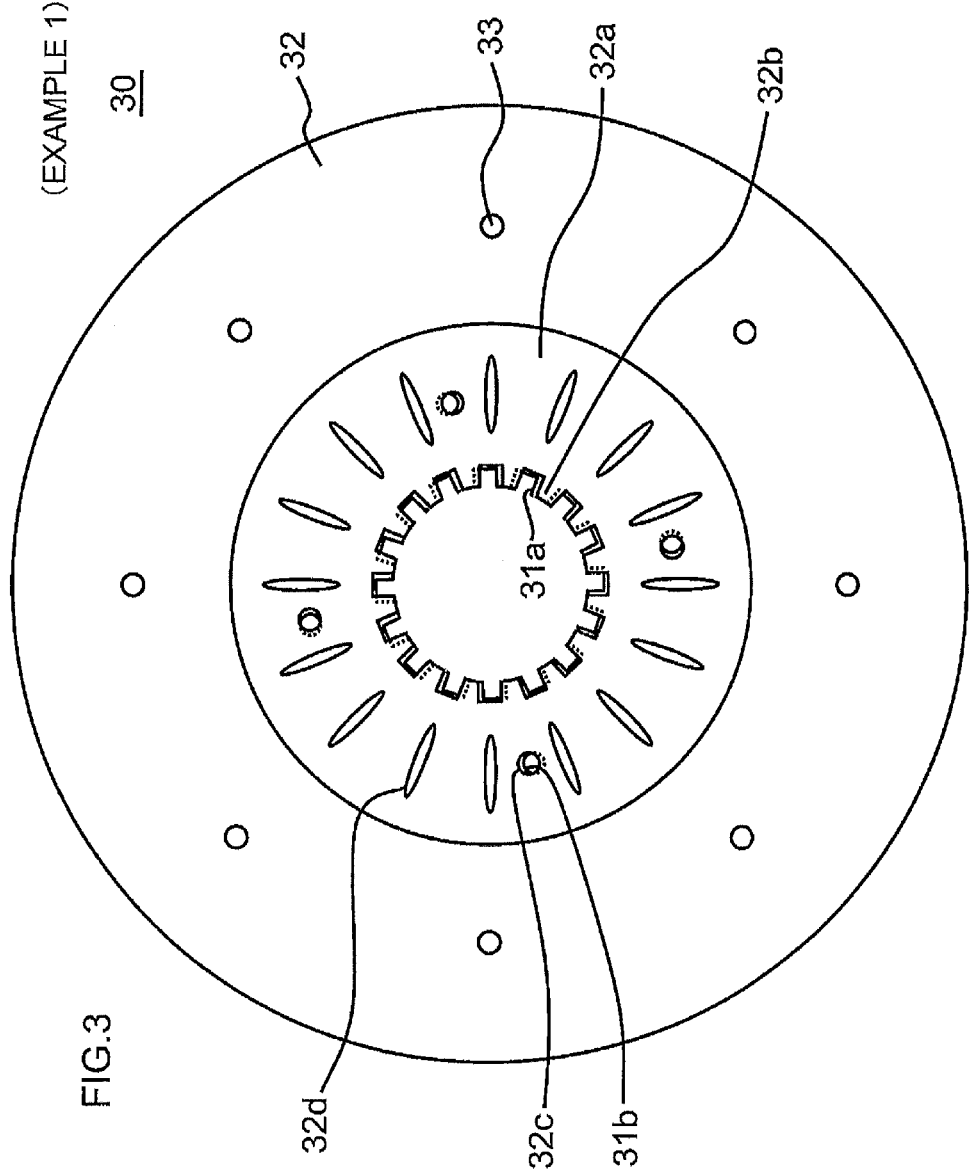
FIG. 3 is a plan view, looking along the axial direction, schematically showing a configuration of an inertial body of the damper device according to Example 1 of the present invention.
Figure 4:
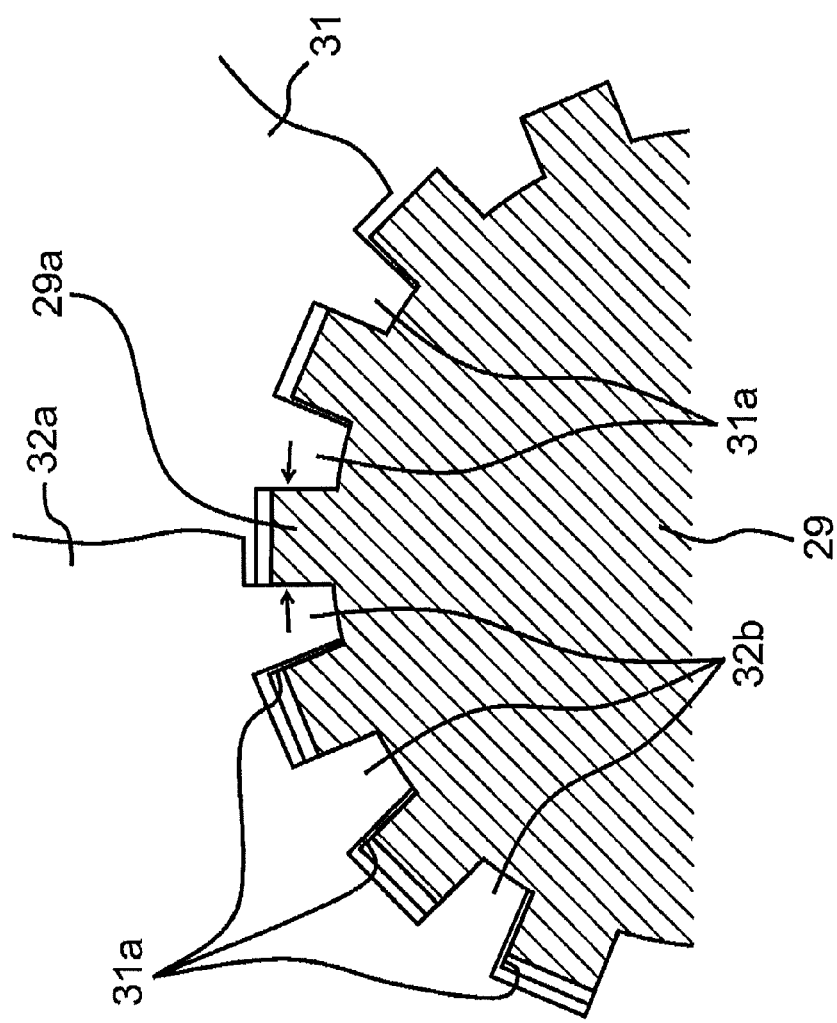
FIG. 4 is a schematic view showing the state of engagement between the inertial body and a shaft of the damper device according to Example 1 of the present invention.
Figure 5:
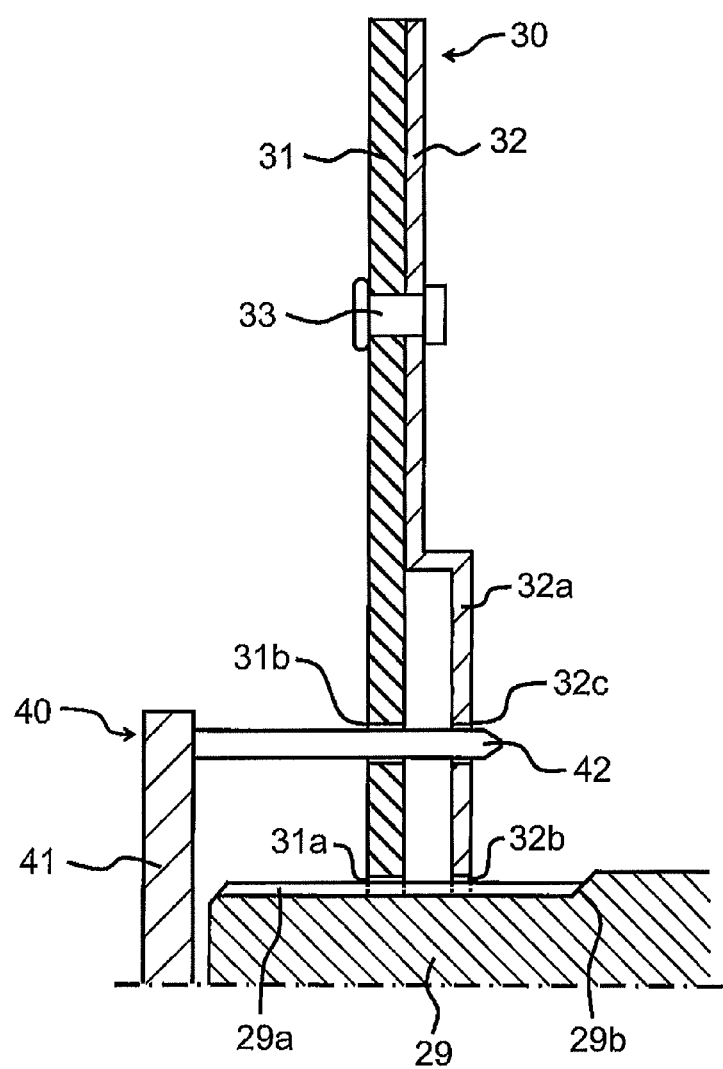
FIG. 5 is a radial partial cross-sectional view showing the state in which the inertial body of the damper device according to Example 1 of the present invention is being assembled to a shaft.

A damper device according to Example 1 of the present invention will now be described with reference to the drawings. FIG. 1 depicts a schematic view showing a configuration of a hybrid driving device including the damper device according to Example 1 of the present invention. FIG. 2 depicts a partial cross-sectional view, taken along the radial direction, and schematically showing the damper device according to Example 1 of the present invention. FIG. 3 depicts a plan view, looking from the axial direction, schematically showing a configuration of an inertial body in the damper device according to Example 1 of the present invention. FIG. 4 depicts a schematic view showing the state of engagement with a shaft of the inertial body in the damper device according to Example 1 of the present invention. FIG. 5 depicts a partial radial cross-sectional view showing the state in which the inertial body in the damper device of Example 1 of the present invention is being assembled to the shaft.

Referring to FIG. 1, a hybrid driving system includes an engine 1, as a first motive power source, and an electric motor 2, as a second motive power source. The system also includes a damper device 3, arranged between the engine 1 and the electric motor 2 to suppress torque fluctuations therebetween. The system also includes a planetary gear mechanism 4 arranged between the electric motor 2 and the damper device 3, and a speed-reducing mechanism 5 that transmits the motive power to driving wheels, not shown. The system further includes a belt 6 interconnecting a ring gear 4d of the planetary gear mechanism 4 and the speed-reducing mechanism 5, a motor generator 7 connected to a sun gear 4a of the planetary gear mechanism 4 and a battery 9 electrically connected via an inverter 8 to the motor generator 7 and to the electric motor 2.

A shaft 1a, as an output shaft of the engine 1, is connected via the damper device 3 and a shaft 29 to a carrier 4c of the planetary gear mechanism 4. A pinion 4b is carried on the carrier 4c for rotation therearound. The pinion 4b is arranged for rotation around an outer rim of the sun gear 4a and meshes with the sun gear 4a and the ring gear 4d. The motor generator 7 has its rotary shaft coupled to the sun gear 4a of the planetary gear mechanism 4 to cause the electrical energy generated by the driving of the engine 1 to be charged in the battery 9. The electric motor 2 has its rotary shaft coupled to the ring gear 4d.

If, in the hybrid driving device, only the engine 1 is in driving operation, the rotational motive power of the engine 1 is transmitted via the damper device 3 and the shaft 29 to the carrier 4c of the planetary gear mechanism 4. The carrier 4c in its entirety is then run in rotation, about the shaft 1a of the engine 1 as center, whereby the ring gear 4d is run into rotation so that motive power is transmitted via belt 6 to the speed-reducing mechanism 5 to drive the driving wheels, not shown. The sun gear 4a is also run in rotation at this time to cause the motor generator 7 to generate an electrical energy which is charged in the battery 9.

If, in the hybrid driving system, the engine 1 is stopped and only the electric motor 2 is run in driving operation, the ring gear 4d is run in rotation, whereby the motive power is transmitted via belt 6 to the speed-reducing mechanism 5. Since the carrier 4c per se is simply rotated about itself, without changing its position, no motive power of the electric motor is transmitted at this time to the engine 1.

With the hybrid driving system, it is also possible to drive both the engine 1 and the electric motor 2 to transmit the motive power to the speed-reducing mechanism 5. Such switching of the motive power sources, more specifically, the switching between the driving and the non-driving of the electric motor 2, may be performed by an electronic control device, not shown, based on a variety of signals, such as vehicle speed or opening degree of an accelerator.

Referring to FIG. 2, the damper device 3 in the hybrid driving system includes a damper unit 3a that has a function to buffer the torsion and absorbs torque fluctuations between the shaft 1a and the shaft 29 under the spring force (force of elasticity). The damper device also includes a hysteresis unit 3b that absorbs or suppresses the torque fluctuations between the shafts 1a and 29 by the hysteresis torque due to friction or the like, and a limiter unit 3c that produces slip when the torque fluctuations between the shafts 1a and 29 can no longer be absorbed by the damper unit 3a and/or the hysteresis unit 3b. The damper unit 3a is arranged in parallel with the hysteresis unit 3b on a path of motive power transmission. The limiter unit 3c is arranged in series with the damper unit 3a and the hysteresis unit 3b on the path of motive power transmission. In light of assembling convenience, the damper device 3 is combined with the damper unit 3a and the hysteresis unit 3b to form a single integral unit (assembly). The damper device 3 includes, as principal components, a flywheel 10, bolts 11, 12, a support plate 13, a cover plate 14, a Belleville spring 15, a pressure plate 16, a lining plate 17, friction materials 18, 19, side plates 20, 21, a rivet(s) 22, a coil spring(s) 23, seat members 24, thrust members 25, 26, a Belleville spring 27, a hub member 28, the shaft 29 and the inertial body 30.

The flywheel 10 is an annular plate member rigidly connected to the shaft 1a of the engine (1 of FIG. 1) by bolt(s) 11. A radially outer rim part of the flywheel 10 includes a cylindrical portion protruded towards the planetary gear mechanism (4 of FIG. 1), that is, towards the right-hand side of FIG. 2. The support plate 13 and the cover plate 14 are rigidly connected and secured by bolt(s) 12 to the cylindrical portion.

The flywheel 10 is run in rotation in unison with the shaft 1a, support plate 13 and the cover plate 14.

The bolt(s) 11 is a member to fasten and secure the flywheel 10 to the shaft 1a of the engine (1 of FIG. 1).

The bolt(s) 12 is a member to fasten and secure the support plate 13 and the cover plate 14 to the flywheel 10.

The support plate 13 is an annular plate member interposed between the flywheel 10 and the cover plate 14, and is a component of the limiter unit 3c. The support plate 13 has its outer rim part aligned with the cover plate 14 and rigidly connected in this state to the flywheel 10 by bolt(s) 12. In an inner rim part of the support plate 13, the support plate is spaced apart from the cover plate 14 to retain an outer rim end of the Belleville spring 15.

The cover plate 14 is an annular member provided on a side of the support plate 13 towards the planetary gear mechanism (4 of FIG. 1), that is, towards the right-hand side of FIG. 2, and is a component of the limiter unit 3c. The cover plate 14 has its outer rim part aligned with the support plate 13 and is rigidly connected in this state to the flywheel 10 by bolt 12. A radially inner rim part of the cover plate 14 is spaced apart from the support plate 13. The cover plate 14 has a through-hole(s) 14a via which the cover plate is engaged with the pressure plate 16 in such a manner that the cover plate may be non-rotatable and axially displaceable with respect to the pressure plate 16 (rotation stop action). To this end, a bent (protrusion) part 16a of the pressure plate 16 is introduced into the through-hole. An inner peripheral surface of the cover plate 14 is slidably pressure-contacted with the friction material 19.

The Belleville spring 15 is an annular saucer-shaped spring arranged between the support plate 13 and the pressure plate 16, and is a component of the limiter unit 3c. The Belleville spring 15 is retained at its outer rim end by the support plate 13 and bears at its inner rim end part against the pressure plate 16 to bias the pressure plate 16 towards the friction material 18.

The pressure plate 16 is an annular member arranged between the Belleville spring 15 and the friction material 18, and is a component of the limiter unit 3c. The pressure plate 16 includes a bent protrusion part 16a to enable the pressure plate 16 to be engaged non-rotatably and axially displaceably in the through-hole 14a of the cover plate 14 (rotation stop action). The bent protrusion part 16a is introduced into the through-hole 14a of the cover plate 14. The pressure plate 16 is biased by the Belleville spring 15 towards the friction material 18 so that the pressure plate is slidably pressure-contacted with the friction material 18.

The lining plate 17 is an annular member disposed between the friction materials 18, 19 disposed between the cover plate 14 and the pressure plate 16, and is a component of the limiter unit 3c. An inner rim part of the lining plate 17 is sandwiched between the side plates 20, 21 and rigidly connected through caulking to the side plates 20, 21 by a plurality of rivets 22. Outer rim parts of the friction materials 18, 19 are secured to an outer rim part of the lining plate 17 by rivets or an adhesive. The lining plate 17 is run in rotation in unison with the friction materials 18, 19 and with the side plates 20, 21.

The friction material 18, a component of the limiter unit 3c, is arranged between the lining plate 17 and the pressure plate 16, and is secured by rivets, an adhesive or the like to the lining plate 17. The friction material 18 is slidably pressure-contacted with the pressure plate 16. Rubber, resin, fibers (short or long fibers) or particles used for adjusting the frictional coefficient $\mu$, may be contained in the friction material 18.

The friction material 19, a component of the limiter unit 3c, is arranged between the lining plate 17 and the cover plate 14, and is secured by rivets, an adhesive or the like to the lining plate 17. The friction material 19 is slidably pressure-contacted with the cover plate 14. Rubber, resin, fibers (short or long fibers) or particles used for adjusting the frictional coefficient $\mu$, may be contained in the friction material 19.

The side plate 20 is an annular member disposed on a side towards the engine (1 of FIG. 1) of a flange 28b of the hub member 28, that is, on the left-hand side in FIG. 2, and is a component of the damper unit 3a and the hysteresis unit 3b. The side plate 20 is caulked, at its outer rim part, in unison to the lining plate 17 and the side plate 21 by a plurality of rivets 22. The side plate 20 includes, in the damper unit 3a, lying at a radially mid part of the damper device, a window 20a in which to accommodate the coil spring 23 and the seat members 24. Both circumferential end faces of the window 20a are detachably contacted with the seat members 24. An inner rim end of the side plate 20 is adapted to be non-rotatable with respect to the thrust member 25 and is carried via the thrust member 25 by the hub member 28, more specifically by its hub part 28a, for rotation relative to the hub member. The side plate 20 is run in rotation in unison with the lining plate 17, friction materials 18, 19 and the side plate 21.

The side plate 21 is an annular member disposed on one side of the flange 28b of the hub member 28 towards the planetary gear mechanism (4 of FIG. 1), that is, on a right-hand side of FIG. 2, and is a component of the damper unit 3a as well as that of the hysteresis unit 3b. The side plate 21 is caulked and secured integrally to the lining plate 17 and the side plate 20 by a plurality of rivets 22 in the vicinity of its outer rim part. The side plate 21 includes, in the damper unit 3a, disposed in a mid part of the damper device, a window(s) 21a in which to accommodate the coil spring 23 and the seat members 24. Both circumferential end face(s) of the window 21a are detachably contacted with the seat members 24. The side plate 21 retains the Belleville spring 27 in the hysteresis unit 3b disposed more inwardly than the damper unit 3a. An inner rim end of the side plate 21 is adapted to be non-rotatable with respect to the thrust member 26 and is carried via the thrust member 26 by the hub member 28, more specifically by its hub part 28a, for rotation relative to the hub member. The side plate 21 is run in rotation in unison with the lining plate 17, friction materials 18, 19 and the side plate 20.

The rivet(s) 22 is a member for fastening the lining plate 17 and the side plates 20, 21 together by caulking.

The coil spring(s) 23 is a component of the damper unit 3a, and is accommodated in each of windows 20a, 21a and 28c, formed in the side plates 20, 21 and in the hub member 28 (flange 28b), respectively, so as to be contacted with the seat members 24 disposed at both ends of the coil spring 23. When the side plates 21, 23 are rotated relative to the hub member 28, the coil spring 23 is compressed to absorb the shock caused by differential rotations of the side plates 20, 21 and the hub member 28. The coil spring 23 may be (with respect to the coil axis) straight-shaped or may be bent or assembled from the straight-shaped springs. However, to realize broad torsion, an arcuately shaped spring, bent along the circumferential direction, may be used.

The seat members 24 are components of the damper unit 3a, and are accommodated in the windows 20a, 21a and 28c formed in the side plates 20, 21 and in the hub member 28, more specifically in its flange 28b. The seat members 24 are disposed at both ends thereof along the direction of contraction of the coil springs 23 between the circumferential end faces of the windows 20a, 21a, 28c and the ends of the coil springs 23. To reduce the wear to the coil spring 23, the seat members 24 may be formed of synthetic resin.

The thrust member 25 is a component of the hysteresis unit 3b, and is an annular member arranged between the side plate 20 and the hub member 28. The thrust member 25 is arranged axially between the side plate 20 and the flange 28b and is slidably pressure-contacted with the flange 28b. The thrust member 25 is locked against rotation relative to the side plate 20, however, the thrust member is displaceable along the axial direction relative to the side plate 20. The thrust member 25 is also interposed along the radial direction between the side plate 20 and the hub portion 28a so as to act as slide bearing (bush) designed for rotatably carrying the side plate 20 relative to the hub portion 28a.

The thrust member 26 is a component of the hysteresis unit 3b, and is an annular member arranged between the side plate 21 and the hub member 28. The thrust member 26 is arranged axially between the Belleville spring 27 and the flange part 28b. The thrust member 26 is biased towards the flange part 28b by the Belleville spring 27 and is slidably pressure-contacted with the flange part 28b. The thrust member 26 is locked against rotation relative to the side plate 21 so that the thrust member is displaceable along the axial direction relative to the side plate 21. The thrust member is also interposed along the radial direction between the side plate 21 and the hub part 28a so as to act as slide bearing (bush) designed for rotatably carrying the side plate 21 relative to the hub part 28a.

The Belleville spring 27 is a component of the hysteresis unit 3b and is a saucer-shaped annular spring arranged between the thrust member 26 and the side plate 21 to bias the thrust member 26 towards the flange portion 28b.

The hub member 28 is a member that outputs the rotational power from the damper unit 3a and the hysteresis unit 3b towards the shaft 29, and is a component of the damper unit 3a and the hysteresis unit 3b. The hub member 28 includes the flange part 28b extending from a pre-set site on an outer rim of the hub part 28a. An inner peripheral surface of the hub part 28a includes inner splines 28d engaged with outer splines 29a of the shaft 29. At an outer rim of the hub part 28a, the hub part rotatably carries the side plate 20 via the thrust member 25, while rotatably carrying the side plate 21 via the thrust member 26. By an end face on axially one side of the hub part 28a towards the planetary gear mechanism (4 of FIG. 1), that is, towards the right-hand side of FIG. 2, the hub part 28a controls the movement along the axial direction of the plate 31 of the inertial body 30. An outer rim of the flange part 28b, lying in the damper unit 3a, includes a window 28c in which to accommodate the coil spring 23 and the seat members 24. Both circumferential end faces of the window 28c are detachably contacted with the seat members 24. In the hysteresis unit 3b, lying more inwardly than the damper unit 3a, the flange part 28b has axially directed surfaces slidably retained (sandwiched) between the thrust members 25, 26.

The shaft 29 is a member designed for transmitting the rotational power from the engine (1 of FIG. 1) via the damper device (3 of FIG. 1) to the carrier (4c of FIG. 1) of the planetary gear mechanism (4c of FIG. 1). On an outer peripheral surface of the shaft 29 in the vicinity of an end of the shaft 29 towards the engine (1 of FIG. 1), that is, on the left-hand end of FIG. 2, the shaft includes outer splines 29a (i.e., radially outwardly directed splines). The hub member 28 and the inertial body 30 are arranged on an outer peripheral surface of the outer splines 29a, which outer splines 29a are engaged with the inner splines 28d of the hub member 28. The outer splines 29a are engaged with the inner splines 31a (i.e., radially inwardly directed splines) of the plate 31 and with the inner splines 32b of the plate 32 in the inertial body 30. The tooth parts of the outer splines 29a are tightened or clamped by the inner splines 31a and the inner splines 32b from both sides thereof along the circumferential direction (see FIG. 4). At an end part on one recessed side (right-hand side of FIG. 2) of the outer splines 29a, there is formed a stepped sidewall section 29b which is a sidewall surface of a stepped part of the shaft where the shaft diameter is increased at an end part of the outer splines 29a. The stepped sidewall section 29b controls the movement along the axial direction of the plate 32 of the inertial body 30.

The inertial body 30 is a substantially annular member that suppresses the chattering of gears (4a, 4b and 4d of FIG. 1) in the planetary gear mechanism (4 of FIG. 1) caused by vibration of the engine (1 of FIG. 1). The inertial body 30 is mounted on the shaft 29 connected to the carrier (4c of FIG. 1) in the planetary gear mechanism (4 of FIG. 1), and has the function of suppressing the circumferential and axial vibration of the shaft 29. The inertial body 30 is in the form of an assembly composed by plates 31, 32 and a rivet(s) 33.

The plate 31 is an annular flat-shaped plate member and is disposed closer to the side plate 21 than is the plate 32. At an outer rim part of the plate 31, the plate 31 contacts with the plate 32 and is connected thereto in this state by a plurality of rivets 33. At an inner rim part of the plate 31, the plate is spaced apart from the plate 32, specifically from a stepped inner rim extension 32a. The inner splines 31a are formed at an inner rim part of the plate 31, and engaged with the outer splines 29a of the shaft 29. In a state where the inertial body 30 has not been assembled to the shaft 29, the tooth parts of the inner splines 31a are out of phase (off-set) with those of the inner splines 32b of the plate 32 (see FIG. 3). When the inertial body 30 has been assembled to the shaft 29, the tooth parts of the inner splines 31a are pressure-contacted with one surfaces circumferentially of the tooth parts of the outer splines 29a (see FIG. 4). In short, when the inertial body 30 has been assembled to the shaft 29, the tooth parts of the inner splines 31a and those of the inner splines 32b clamp the tooth parts of the outer splines 29a from both of their circumferentially directed sides. This suppresses vibration of the inertial body 30 with respect to the shaft 29 in the circumferential direction. A correction through-hole(s) 31b is bored at a preset location(s) in a portion of the plate 31 spaced apart from the plate 32 (stepped inner rim extension 32a). The correction through-hole 31b is a through-hole into which is introduced an extension 42 of a correction jig 40 used for correcting the phase offset between the tooth parts of the inner splines 31a and those of the inner splines 32b when the inertial body 10 is assembled to the shaft 29 (see FIG. 5). The correction through-hole 31b has a phase offset with respect to a correction through-hole 32c of the plate 32 which is later explained. The phase offset is so set that, when the inertial body 30 has not been assembled to the shaft 29, the phase offset between the correction through-hole 31b and the correction through-hole 32c in the plate 32 is in agreement with the phase offset between the tooth parts of the inner splines 31a, 32b (see FIG. 3). The plate 31, inclusive of the inner splines 31a, is pressure-contacted with an end face on axially one side of the hub part 28a of the nub member 28. A slit, not shown, like a slit 32d, may be formed in the plate 31 to assure facilitated elastic flexure in the direction of torsion, that is, circumferential direction, and in the axial direction.

The plate 32 is an annular plate member having a step difference at its mid portion, and may be formed by press molding a plate member. The plate 32 is disposed closer to the planetary gear mechanism (4 of FIG. 1) than is the plate 31, that is, on the left-hand side of FIG. 2. Towards an outer rim part of the plate 32, the plate 32 contacts with the plate 31 and is rigidly connected thereto via a plurality of rivets 33. At a mid part of the plate 32, the plate has a step difference and, at an inner rim part, the plate 32 has the stepped inner rim extension 32a spaced apart from the plate 31. The stepped inner rim extension 32a has inner splines 32b at its inner rim end. The inner splines 32b are engaged with the outer splines 29a of the shaft 29. The tooth parts of the inner splines 32b are out of phase (offset) relative to the tooth parts of the inner splines 31a of the plate 31 in a state where the inertial body 30 has not been assembled to the shaft 29 (see FIG. 3). However, in a state where the inertial body 30 has been assembled to the shaft 29, the tooth parts of the inner splines 32b are pressure-contacted with the opposite side surfaces along the circumferential direction of the tooth parts of the outer splines 29a (see FIG. 4). In short, when the inertial body 30 has been assembled to the shaft 29, the tooth parts of the inner splines 32b and those of the inner splines 31a clamp the tooth parts of the outer splines 29a from both sides thereof in the circumferential direction. This suppresses rattling in the circumferential direction of the inertial body 30 with respect to the shaft 29. The stepped inner rim extension 32a has the above mentioned correction through-hole 32c at a pre-set location(s). The correction through-hole 32c is a through-hole(s) into which is introduced the protruding part 42 of the correction jig 40 used for correcting the phase offset between the tooth parts of the inner splines 31a and the inner splines 32b (see FIG. 5). When the inertial body 30 has not been assembled to the shaft 29, the correction through-hole 32c has a pre-set phase offset relative to the correction through-hole 31b of the plate 31 which is in keeping with the phase offset between the tooth parts of the inner splines 31a and those of the inner splines 32b (see FIG. 3). The stepped inner rim extension 32a includes a plurality of slits 32d that allow the inner rim extension 32a to be elastically flexed with ease in the direction of torsion in the circumferential direction) as well as in the axial direction. The stepped inner rim extension 32a is pressure-contacted with the stepped sidewall section 29b of the shaft 29 with the inner splines 32b thrusting the stepped sidewall section 29b. In short, with the inner splines 32b of the stepped inner rim extension 32a thrusting the stepped sidewall section 29b, the plate 31 inclusive of the inner splines 31a is pressure-contacted with an end face on axially one side of the hub part 28a. This suppresses vibration in the axial direction of the inertial body 30 with respect to the shaft 29 to assure positioning of the inertial body 30. It is observed that the distance between the inner rim end of the stepped inner rim extension 32a and the plate 31 is set so that a distance when the inertial body 30 has not been assembled to the shaft 29 will be greater than a distance when the inertial body 30 has been assembled to the shaft 29.

The rivet(s) 33 is a member used for rigidly connecting the plates 31, 32 together by caulking.

In assembling the inertial body 30 to the shaft 29, the protruding part (axial protrusion) 42 of the correction jig 40 is introduced into the correction through-holes 31b and 32c of the inertial body 30 which is still in a single body, non-assembled state. By so doing, the plates 31, 32 are elastically flexed relative to each other in the direction of torsion (in the circumferential direction). This causes the tooth parts of the correction through-holes 31b and 32c, having a relative phase offset, to become registered relative to each other as viewed in the axial direction. The inertial body 30 may then be slid in the tooth parts of the outer splines 29a of the shaft 29 such as to fit the inertial body on the shaft 29. The correction jig 40 is composed by a base member 41 carrying on its one side surface a plurality of the protruding parts 42. In fitting the inertial body 30 on the shaft 29, the base member 41 is placed so as to be in contact with the foremost part of the shaft 29, and just the inertial body 30 is pushed out (axially). By so doing, the inertial body 30 is fitted on the shaft 29, whereupon the correction jig 40 may automatically be removed. Thereby the assembling convenience is improved.

In Example 1, the inner splines 31a and the inner splines 32b in the inertial body 30 are phase-offset relative to each other, as a result of which the tooth parts of the inner splines 31a and the inner splines 32b clamp the tooth parts of the outer splines 29a from their both sides in the circumferential direction. This suppresses rattling in the circumferential direction of the inertial body 30 with respect to the shaft 29 to suppress chattering or the like in the gear mechanism. Moreover, the inner splines 32b of the stepped inner rim extension 32a in the inertial body 30 urge thrust against the stepped sidewall section 29b of the shaft 29 to cause the inner splines 31a of the plate 31 to be pressure-contacted with the end face on an axially one side of the hub body 28a. This suppresses rattling in the axial direction of the inertial body 30 with respect to the shaft 29 to assure positioning of the inertial body 30.

Example 2

Figure 6:
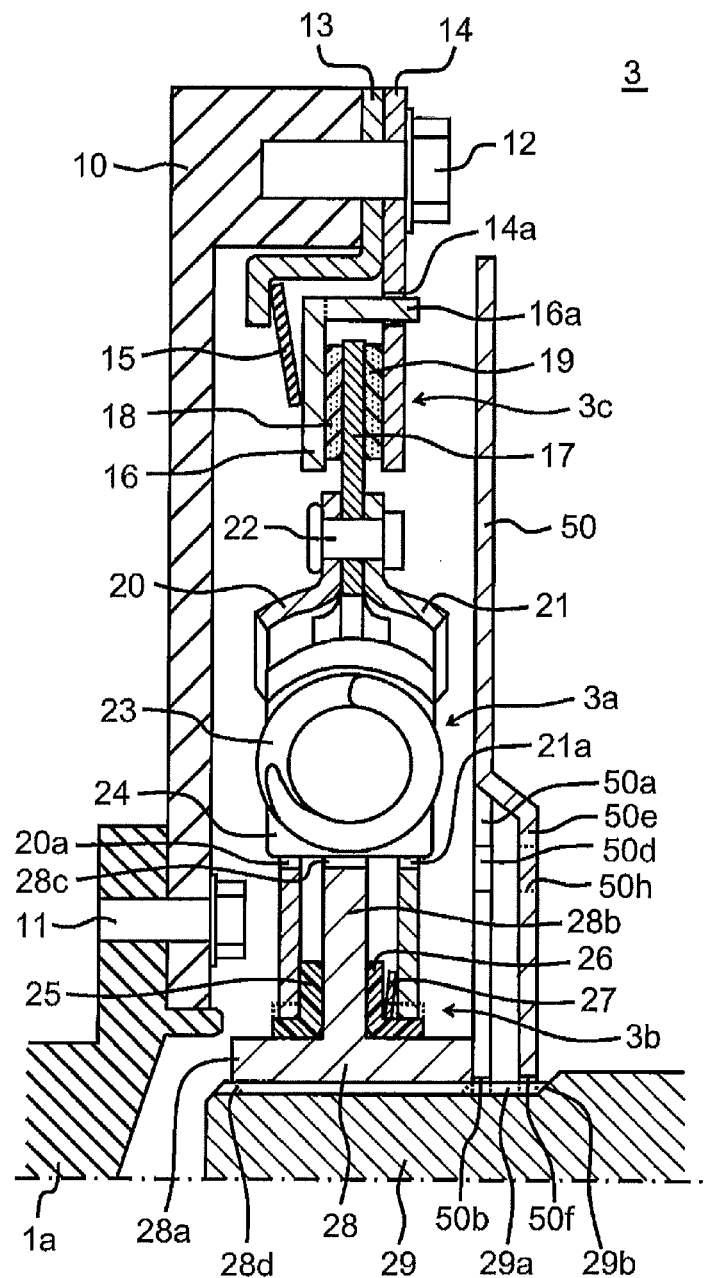
FIG. 6 is a radial partial cross-sectional view schematically showing the configuration of a damper device according to Example 2 of the present invention.
Figure 7:
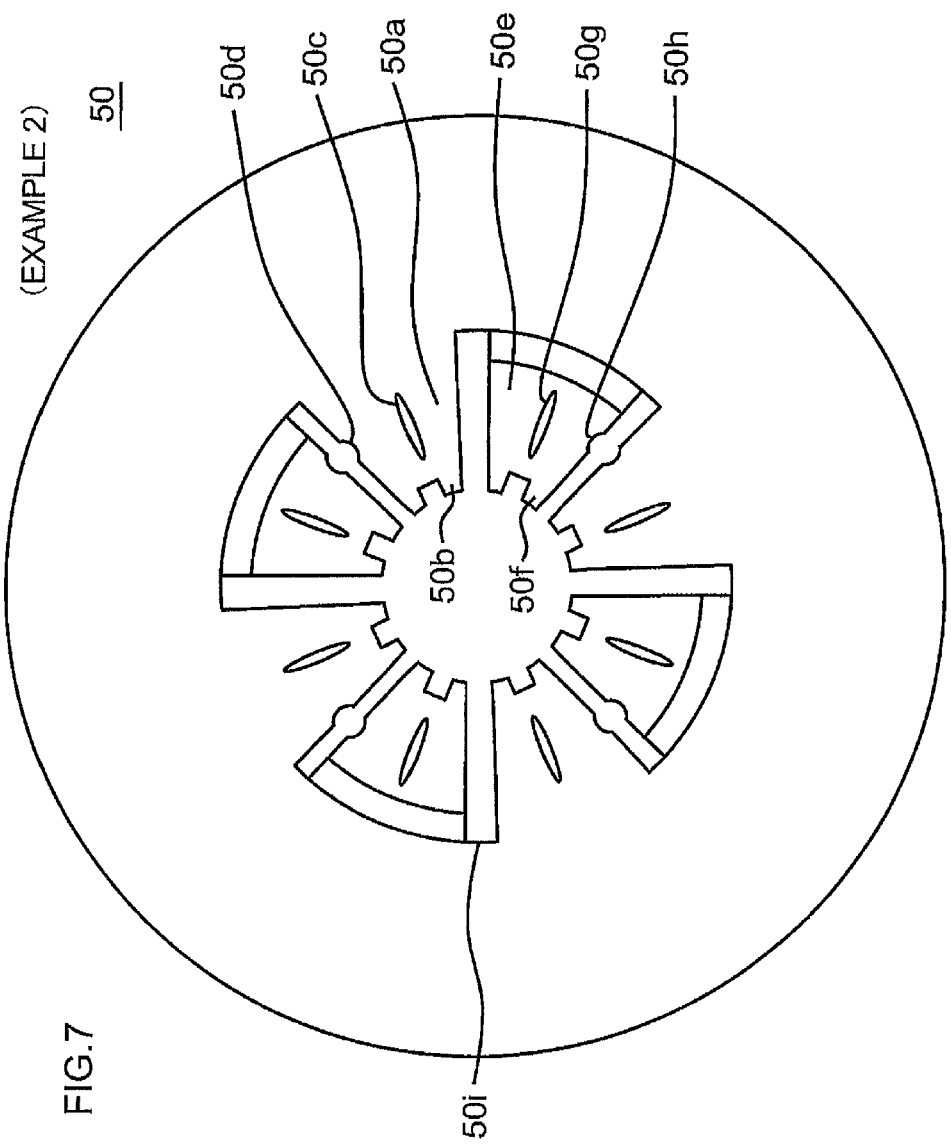
FIG. 7 is a plan view, looking along the axial direction, schematically showing a configuration of an inertial body of the damper device according to Example 2 of the present invention.
Figure 8:
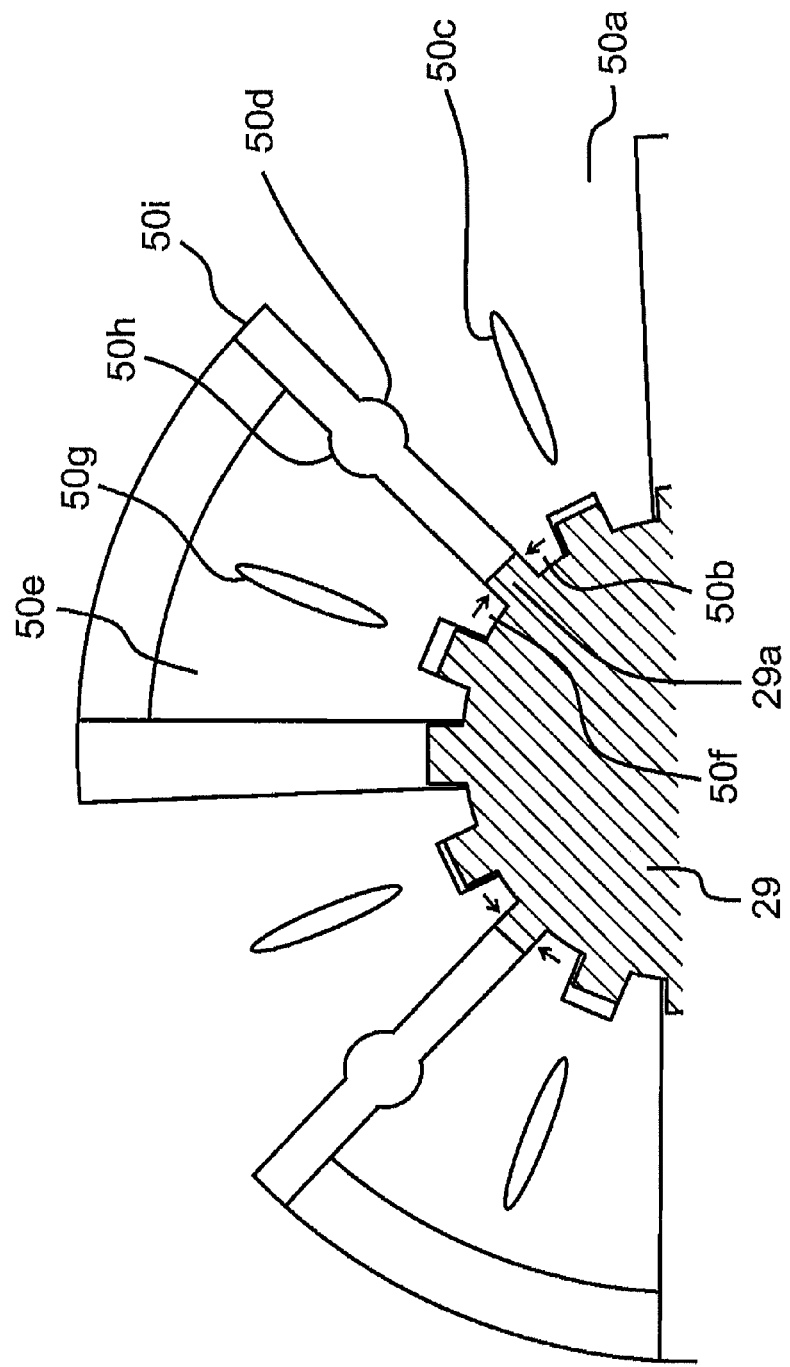
FIG. 8 is a schematic view showing the state of engagement between the inertial body and a shaft of the damper device according to Example 2 of the present invention.
Figure 9:
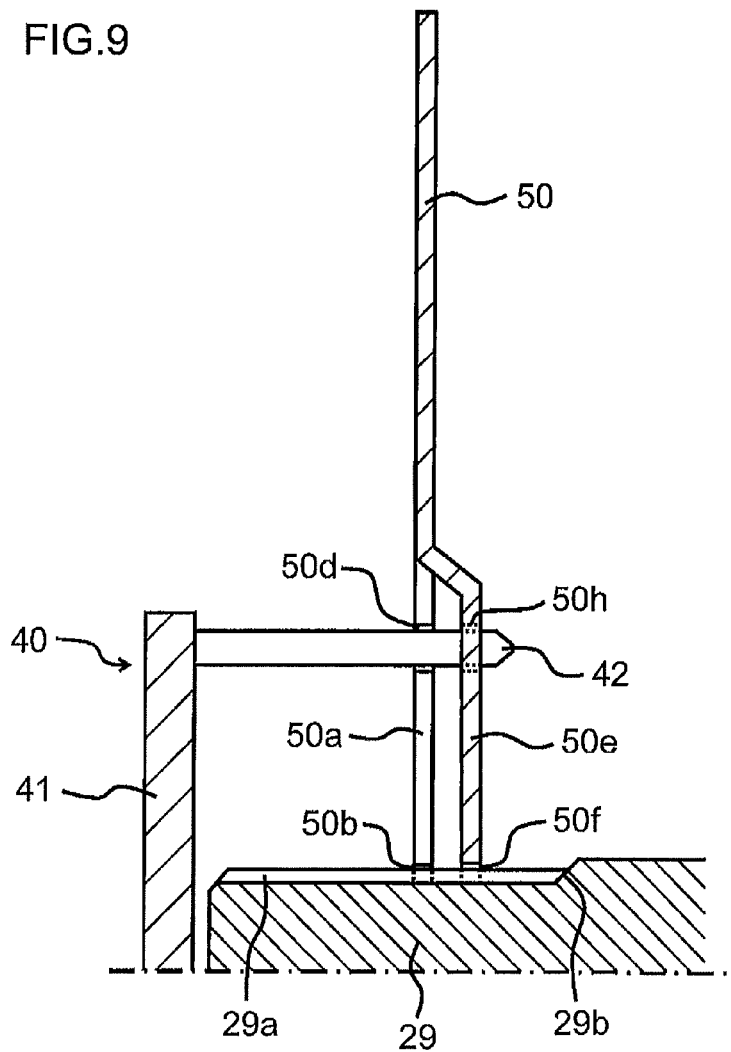
FIG. 9 is a radial partial cross-sectional view showing the state in which the inertial body of the damper device according to Example 2 of the present invention is being assembled to a shaft.

A damper device according to Example 2 of the present invention will now be described with reference to the drawings. FIG. 6 depicts a radial partial cross-sectional view schematically showing a configuration of a damper device according to Example 2 of the present invention. FIG. 7 depicts a plan view, as viewed in the axial direction, schematically showing a configuration of the inertial body in the damper device according to Example 2 of the present invention. FIG. 8 is a schematic view showing the state of engagement between the inertial body and the shaft in the damper device according to Example 2 of the present invention. FIG. 9 depicts a radial partial cross-sectional view showing the state in which the inertial body is being assembled to the shaft in the damper device according to Example 2 of the present invention.

In Example 2, a modification of Example 1, an inertial body 50 is composed by a single component. Except the inertial body 50, the configuration is similar to that of Example 1.

The inertial body 50 is an annular plate member designed to suppress chattering of gears (4a, 4b, 4d of FIG. 1) of the planetary gear mechanism (4 of FIG. 1) caused by vibration of the engine (1 of FIG. 1). The inertial body 50 is mounted on the shaft 29 coupled to the carrier (4c of FIG. 1) in the planetary gear mechanism (4 of FIG. 1) and has a function to suppress rattling in the circumferential and axial directions of the shaft 29. The inertial body 50 may be formed by press-forming a single plate member, and is arranged between the hub part 28a of the hub member 28 and the stepped sidewall section 29b of the shaft 29. The inertial body 50 is formed with a plurality of slits 50i extending from an inner rim part to a mid part, and includes a plurality of inner rim extensions (extending area) 50a, extending from an inner rim end of an annular portion, and a plurality of stepped inner rim extensions (extending areas) 50e. The inner rim extensions 50a are coplanar with the annular portion of the inertial body. The axially stepped inner rim extensions 50e are axially stepped so as to be offset relative to the annular portion.

The slits 50i are voids (clearances) provided in the circumferential direction between the inner rim extensions 50a and the stepped inner rim extensions 50e. The inner rim extensions 50a and the stepped inner rim extensions 50e are alternately formed in the circumferential direction. An inner rim end of each of the inner rim extensions 50a is formed with inner splines 50b which inner splines 50b are engaged with the outer splines 29a of the shaft 29. The inner splines 50b are engaged with the outer splines 29a of the shaft 29. An inner rim end of each of the stepped inner rim extensions 50e is formed with inner splines 50f which inner splines 50f are engaged with the outer splines 29a of the shaft 29. The tooth parts of the inner splines 50b are set so that, when the inertial body 50 is not yet assembled to the shaft 29, the tooth parts of the inner splines 50b are phase-offset with respect to the tooth parts of the inner splines 50f, and so that, when the inertial body 50 is not yet assembled to the shaft 29, the tooth parts of the inner splines 50b are pressure-contacted with one surfaces on circumferentially one sides of the tooth parts of the outer splines 29a (see FIG. 8). In short, when the inertial body 50 has been assembled to the shaft 29, the tooth parts of the inner splines 50b and the tooth parts of the inner splines 50f clamp pre-set tooth parts of the outer splines 29a (the tooth parts of the outer splines corresponding to the jig introduced into the slits 50i having correction recesses 50d, 50h) from both sides of the tooth parts in the circumferential direction. This suppresses rattling in the circumferential direction of the inertial body 50 with respect to the shaft 29.

Each of the inner rim extensions 50a includes the correction recess 50d on one of its sidewall surfaces in the circumferential direction. Each of the stepped inner rim extensions 50e includes the correction recess 50h on a opposite sidewall surface portion in the circumferential direction. The correction recesses 50d, 50h are recesses via which the protruding part 42 of the correction jig 40 used for correcting the phase offset between the tooth parts of the inner spines 50b and the tooth parts of the inner splines 50f is introduced (see FIG. 9). The stepped inner rim extensions 50e are so set that, when the inertial body 50 is not yet assembled to the shaft 29, the correction recess 50h will be at a position approached to the correction recess 50d. Each of the inner rim extensions 50a is formed with a slit 50c that allows facilitated elastic flexure of the inner rim extension. Each of the stepped inner rim extensions 50e is formed with a slit 50g to allow facilitated flexure of the stepped inner rim extension in the direction of torsion (circumferential direction) and in the axial direction.

The inertial body 50 is pressure-contacted, by its inner rim extensions 50a, inclusive of the inner splines 50b, with an end face on an axially one side of the hub part 28a of the hub member 28. The inertial body is pressure-contacted with the stepped sidewall section 29b of the shaft 29, with the inner splines 50f of the stepped inner rim extensions 50e urging thrust against the stepped sidewall section 29b of the shaft 29. In short, with the inner splines 50f of the stepped inner rim extension 50e thrusting the stepped sidewall section 29b, the inner rim extensions 50a inclusive of the inner splines 50b are pressure-contacted with an end face on an axially one side of the hub part 28a. This suppresses rattling in the axial direction of the inertial body 50 with respect to the shaft 29 to assure positioning of the inertial body 50. It is observed that the distance between the inner rim ends of the stepped inner rim extensions 50e and the inner rim extensions 50a is set so that a distance when the inertial body 50 is not assembled to the shaft 29 will be greater than a distance when the inertial body 50 has been assembled to the shaft 29.

In assembling the inertial body 50 to the shaft 29, the protruding part 42 of the correction jig 40 is introduced into the correction recesses 50d, 50f of the inertial body 50 which is in a single body state. The inner rim extensions 50a and the stepped inner rim extensions 50e are thus elastically flexed relative to each other in the direction of torsion (in the circumferential direction). This causes the tooth parts of the inner splines 50b, 50f, having phase offsets relative to each other, to assume their normal positions. The inertial body 50 may then be slid over along the tooth parts of the outer splines 29a of the shaft 29 such as to fit the inertial body 50 on the shaft 29. Specifically, the correction jig 40 is composed by a base member 41 carrying on its one side surface a plurality of the protruding parts 42. In fitting the inertial body 50 on the shaft 29, the base member 41 of the correction jig 40 is placed so as to come to contact with the foremost part of the shaft 29, and just the inertial body 50 is pushed out. By so doing, the inertial body 50 is fitted on the shaft 29, whereupon the correction jig 40 may automatically be removed, thereby improving the assembling performance.

In Example 2, the advantageous effects similar to those in Example 1 may be obtained. In addition, since the inertial body 50 is formed of a single member, the cost of the device may be reduced.

Example 3

Figure 10:
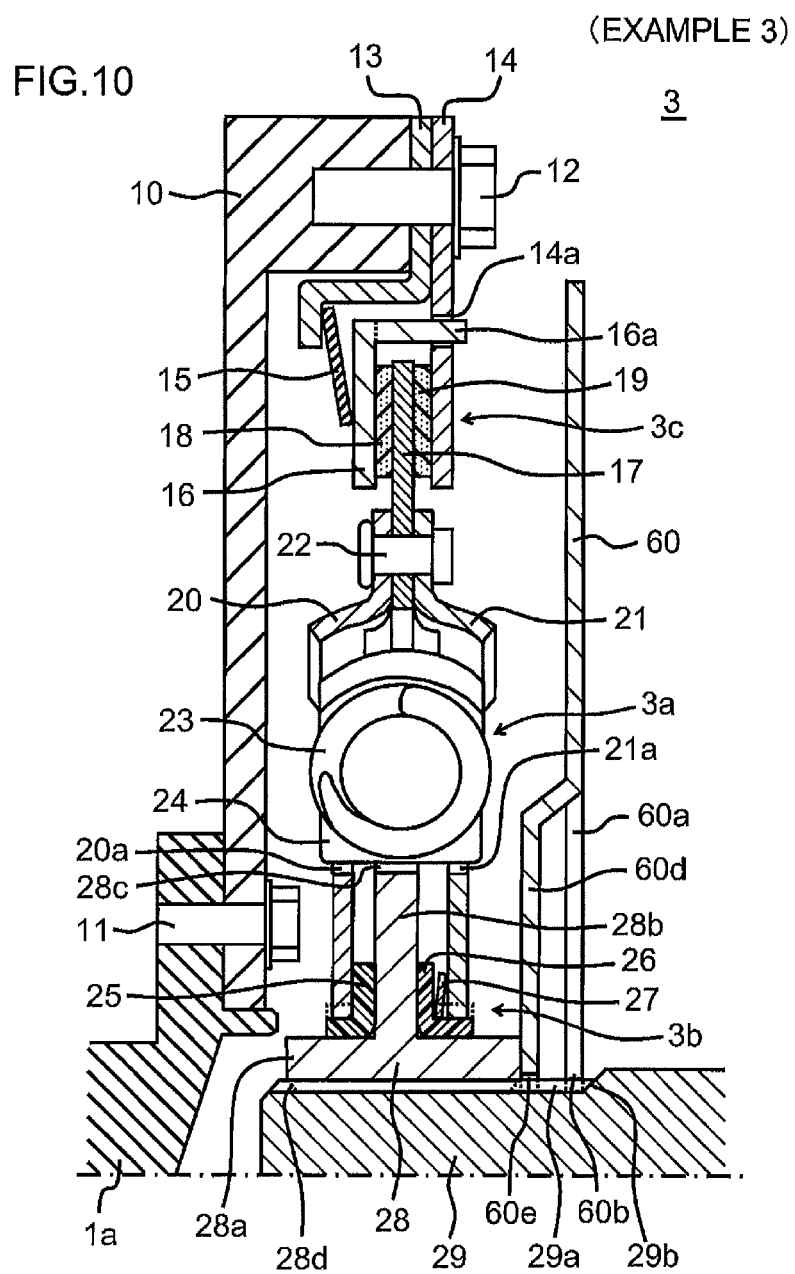
FIG. 10 is a radial partial cross-sectional view schematically showing a configuration of a damper device according to Example 3 of the present invention.
Figure 11:
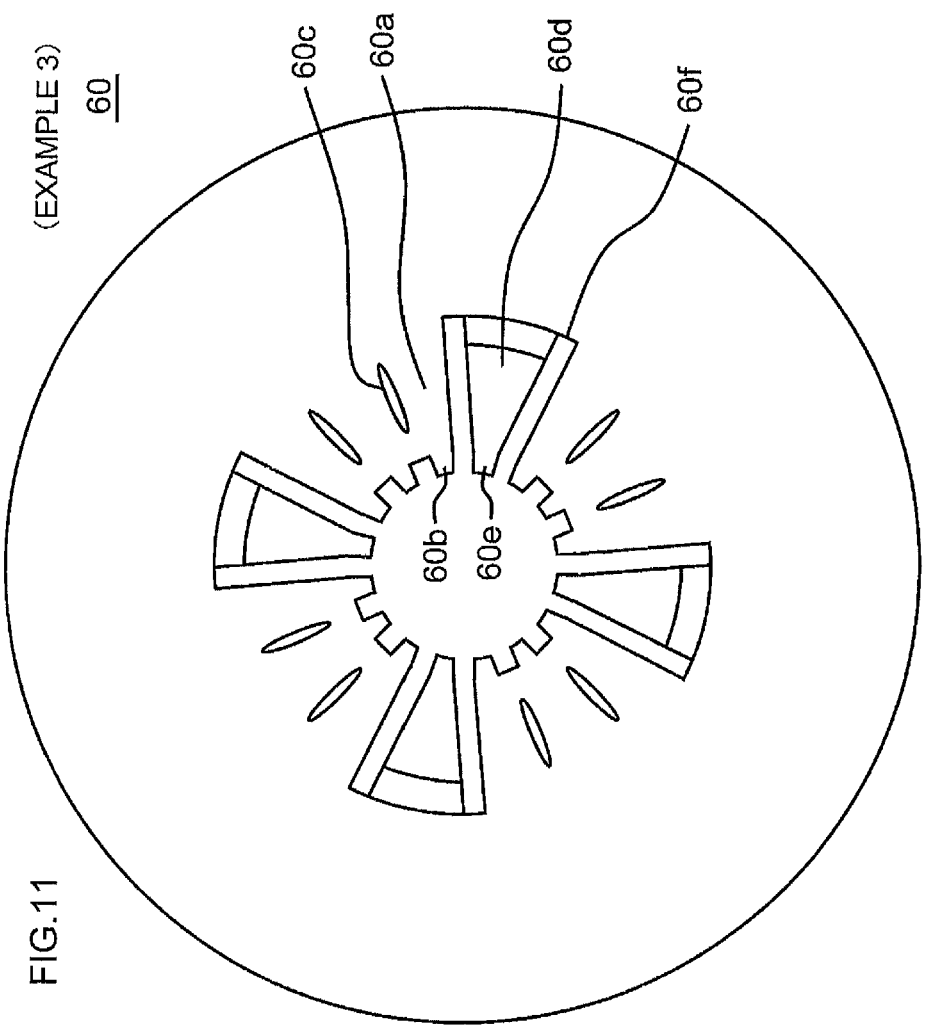
FIG. 11 is a plan view, looking along the axial direction, schematically showing a configuration of an inertial body of the damper device according to Example 3 of the present invention.

A damper device of Example 3 of the present invention will now be described with reference to the drawings. FIG. 10 depicts a radial partial cross-sectional view schematically showing a configuration of a damper device according to Example 3 of the present invention. FIG. 11 depicts a plan view, looking from the axial direction, showing a configuration of an inertial body in the damper device according to Example 3 of the present invention. FIG. 12 depicts a schematic view showing the state of engagement between the inertial body and the shaft in the damper device according to Example 3 of the present invention.

Example 3 is a modification of Example 1. In an inertial body 60 of the Example 3, inner splines 60b, 60e are not phase-shifted, but the tooth parts of the inner splines 60e are press-fitted between the tooth parts of the outer splines 29a of the shaft 29 so that the tooth parts of the inner splines 60e are pressure-contacted with the tooth parts of the outer splines 29a on both sides thereof in the circumferential direction. Stated differently, the tooth parts of the inner splines 60e are clamped from both sides thereof by the tooth parts of the outer splines 29a in the circumferential direction. The inertial body is formed as a single member. Except the inertial body 60, the subject Example is similar in configuration to Example 1.

The inertial body 60 is a substantially annular plate member that suppresses the chattering of gears (4a, 4b and 4d of FIG. 1) in the planetary gear mechanism (4 of FIG. 1) caused by vibration of the engine (1 of FIG. 1). The inertial body 60 is mounted on the shaft 29 connected to the carrier (4c of FIG. 1) in the planetary gear mechanism (4 of FIG. 1), and has a function of suppressing the rattling of the shaft 29 in the circumferential and axial directions. The inertial body may be formed by press-forming a single plate member. The inertial body is disposed between the hub part 28a of the hub member 28 and the stepped sidewall section 29b of the shaft 29. The inertial body 60 is formed with a plurality of slits 60f extending from an inner rim part to a mid part, and includes a plurality of inner rim extensions 60a extending from the inner rim end of an annular portion, and a plurality of stepped inner rim extensions 60d. The inner rim extensions 60a are coplanar with the annular portion of the inertial body. The stepped inner rim extension 60d is stepped so as to be offset relative to the annular portion in the axial direction.

The slits 60f are voids (clearance) provided in the circumferential direction between the inner rim extensions 60a and the stepped inner rim extensions 60d. The inner rim extensions 60a and the stepped inner rim extensions 60d are alternately formed in the circumferential direction. The width of each of the inner rim extensions 60a in the circumferential direction is set so as to be larger than a width in the circumferential direction of each of the stepped inner rim extensions 60d. Inner rim ends of each of the inner rim extensions 60a are formed with inner splines 60b which inner splines 60b are engaged with outer splines 29a of the shaft 29. Inner rim ends of the stepped inner rim extensions 60d are formed with inner splines 60e, which inner splines 60e are engaged with the outer splines 29a of the shaft 29. Inner rim ends of the stepped inner rim extensions 60d are formed with inner splines 60e, which inner splines 60e are press-fitted into the outer splines 29a of the shaft 29. The circumferential sides of tooth part of the inner splines 60e act so as to urge a force to separate away from each other from both side surfaces of tooth parts of the outer splines 29a in the circumferential direction so as to be pressure-contacted with the tooth parts of the outer splines 29a on both sides of the tooth parts of the outer splines 29a on both circumferential sides (see FIG. 12). This suppresses the rattling of the inertial body 60 relative to the shaft 29 in the circumferential direction. It is unnecessary that the inner splines 60e are phase-offset with respect to the inner splines 60b. The number of tooth parts of the inner splines 60e is preferably smaller than that of the inner splines 60b for improving the assembling performance to the shaft 29. Each of the inner rim extensions 60a is formed with a slit (or slits) 60c. Although there is formed no slit in the stepped inner rim extension 60d, it may also be formed therein.

The inertial body 60 is pressure-contacted, by the inner splines 60b of its inner rim extensions 60a, with the stepped sidewall section 29b of the shaft 29. The inertial body 60 is pressure-contacted with the stepped sidewall section 29b of the shaft 29 with the stepped inner rim extensions 60d inclusive of inner splines 60e thrusting an end face on an axially one side of the hub part 28a of the hub member 28. In short, with the stepped inner rim extension 60d inclusive of the inner splines 60b thrusting the end face on an axially one side of the hub part 28a, the inner splines 60b of the inner rim extensions 60a are pressure-contacted with the stepped sidewall section 29b. This suppresses rattling in the axial direction of the inertial body 60 with respect to the shaft 29 to assure positioning of the inertial body 60. It is observed that the distance between the inner rim end of the stepped inner rim extension 60d and the inner rim extension 60a is set so that a distance when the inertial body 60 is not assembled to the shaft 29 will be greater than a distance when the inertial body 60 has been assembled to the shaft 29. Here, the stepped inner rim extensions 60d, inclusive of the inner splines 60e, thrust the end face on an axially one side of the hub part 28a to cause the inner splines 60b of the inner rim extensions 60a to be pressure-contacted with the stepped sidewall section 29b. However, the operating direction may be reversed. That is, the inner splines 60e of the stepped inner rim extensions 60d may thrust the stepped sidewall section 29b to cause the inner rim extension 60a, inclusive of the inner splines 60b, to be pressure-contacted with the end face on axially one side of the hub part 28a.

In mounting the inertial body 60 to the shaft 29, it is preferred that the shaft 29 is first introduced onto an inner rim of the inner rim extension 60a, after which the shaft 29 is introduced onto the inner rim of the stepped inner rim extension 60d, thereby improving the assembling performance.

In Example 3, the tooth parts of the inner splines 60e of the inertial body 60 are press-fitted between the tooth parts of the outer splines 29a of the shaft 29 so that the tooth parts of the inner splines 60e are pressure-contacted on both sides thereof with the tooth parts of the outer splines 29a in the circumferential direction. By so doing, it is possible to suppress rattling in the circumferential direction of the inertial body 60 with respect to the shaft 29, thereby suppressing the chattering in the gear mechanism or the like. In addition, the stepped inner rim extensions 60d of the inertial body 60 thrust the end face on axially one side of the hub part 28a to cause the inner rim extensions 60a to be pressure-contacted with the stepped sidewall section 29b of the shaft 29. By so doing, it becomes possible to suppress rattling in the axial direction of the inertial body 60 with respect to the shaft 29 as well as to assure positioning of the inertial body 60.

Example 4

A damper device according to Example 4 of the present invention will now be described with reference to the drawings. FIG. 13 depicts a radial partial cross-sectional view schematically showing a configuration of a damper device according to Example 4 of the present invention. FIG. 14 is a plan view, as viewed from the axial direction, showing a configuration of an inertial body in the damper device according to Example 4 of the present invention. FIG. 15 is a schematic view showing the state of engagement between the inertial body and the shaft in the damper device according to Example 4 of the present invention.

Example 4 is a modification of Example 3. In Example 4, an inertial body 70 is composed by a plurality of components. Except the inertial body 70, the subject Example is similar to Example 3.

The inertial body 70 is an annular member that suppresses the chattering of gears (4a, 4b and 4d of FIG. 1) in the planetary gear mechanism (4 of FIG. 1) caused by vibration of the engine (1 of FIG. 1). The inertial body 70 is mounted on the shaft 29 connected to the carrier (4c of FIG. 1) in the planetary gear mechanism (4 of FIG. 1), and has a function of suppressing the rattling of the shaft 29 in the circumferential and axial directions. The inertial body 70 is an assembly formed by plates 71, 72 and a rivet 73.

The plate 71 is an annular flat plate member arranged on a side closer than the plate 72 to the planetary gear mechanism (4 of FIG. 1), that is, on the right-hand side in FIG. 13. In an outer rim side part of the plate 71, the plate 71 is in contact with the plate 72, and is rigidly connected thereto via a plurality of the rivets 73. In an inner rim side part of the plate 71, the plate 71 is spaced apart from the plate 72, specifically, its stepped inner rim extensions 72a. In an inner rim of the plate 71, there are formed inner splines 71a, which inner splines 71a are in splined engagement with the outer splines 29a of the shaft 29. The inner splines 71a are pressure-contacted with the stepped sidewall section 29b of the shaft 29.

The plate 72 is an annular plate member an inner rim part of which has a plurality of the stepped inner rim extensions 72a. The plate 72 may be formed by press-forming. The plate 72 is disposed closer to the side plate 21 than the plate 71. At an outer rim part of the plate 72, the plate 72 is in contact with the plate 71, and is connected in this state to the plate 71 by the rivets 73. In an inner rim part of the plate 72, the plate has a step and stepped inner rim extensions 72a spaced apart from the plate 71. In an inner rim end of each of the stepped inner rim extensions 72a, the stepped inner rim extension 72a is formed with inner splines 72b. The inner splines 72b are press-fitted to the outer splines 29a of the shaft 29. The tooth parts of the inner splines 72b operate at circumferentially both sides thereof to be thrust apart by the tooth parts of the outer splines 29a in the circumferential direction. Stated differently, the tooth parts of the inner splines 72b are clamped at circumferentially both sides thereof between the tooth parts of the outer splines so as to be pressure-contacted with the tooth parts of both outer splines 29a in the circumferential direction (see FIG. 15). This suppresses rattling of the inertial body 70 in the circumferential direction with respect to the shaft 29. It is unnecessary that the inner splines 72b are phase-offset relative to the inner splines 71a. From the perspective of assembling performance, the number of tooth parts of the inner splines 72b is preferably lesser than that of the inner splines 71a. The stepped inner rim extensions 72a, inclusive of the inner splines 72b, are pressure-contacted with an end face on axially one side of the hub part 28a of the hub member 28 such that the stepped inner rim extensions thrust the end face on axially one side of the hub part 28a. That is, the plate 71 is pressure-contacted with the stepped sidewall section 29b of the shaft 29 by the stepped inner rim extensions 72a inclusive of the inner splines 72b thrusting the end face on axially one side of the hub part 28a. This suppresses rattling of the inertial body 70 with respect to the shaft 29 in the axial direction to realize positioning the inertial body 70. It is observed that the distance between the inner rim end of the stepped inner rim extension 72a and the plate 71 is set so that a distance when the inertial body 70 is not assembled to the shaft 29 will be greater than a distance when the inertial body 70 has been assembled to the shaft 29. Although there is formed no slit in the stepped inner rim extensions 72a, it may also be formed therein.

The rivet(s) 73 is a member used for fastening the plates 71, 72 together by caulking.

It is noted that the stepped inner rim extensions 72a, inclusive of the inner splines 72b, here thrust the end face on axially one side of the hub part 28a to cause the plate 71 to be pressure-contacted with the stepped sidewall section 29b. However, the operating direction may be reversed. That is, the inner splines 72b of the stepped inner rim extensions 72a may thrust the stepped sidewall section 29b to cause the plate 71 inclusive of the inner splines 71a to be pressure-contacted with the end face on axially one side of the hub part 28a.

In mounting the inertial body 70 to the shaft 29, preferably the shaft 29 is first introduced as it is fitted onto the inner rim of the plate 71, after which the shaft 29 is introduced as it is fitted onto the inner rim of the stepped inner rim extensions 72a for assembling. Doing so may improve the operation performance.

In Example 4, the advantageous effects similar to those of Example 3 may be obtained.

Example 5

A damper device according to Example 5 of the present invention will now be described with reference to the drawings. FIG. 16 depicts a radial partial cross-sectional view schematically showing the configuration of a damper device according to Example 5 of the present invention.

Example 5 is a modification of Example 1. In Example 5, the stepped sidewall section 29b of the shaft 29 is not thrust by the inner splines 32b of the stepped inner rim extension 32a of the inertial body 30, but a Belleville spring 80 is provided between the stepped inner rim extension 32a of the inertial body 30 and the stepped sidewall section 29b of the shaft 29. Otherwise, the subject Example is similar to Example 1.

The Belleville spring 80 is an annular saucer-like elastic member, and preferably is formed of metal from the perspective of durable life. The Belleville spring 80 is spline-engaged at its inner rim end with the outer splines 29a of the shaft 29 (for preventing rotation). The Belleville spring 80 is retained at its inner rim end by the stepped sidewall section 29b of the shaft 29, while biasing, at its outer rim end, the stepped inner rim extension 32a of the inertial body 30 towards the hub member 28.

It is observed that an arrangement of Example 5 in which the Belleville spring 80 is disposed between the inertial body 30 and the stepped sidewall section 29b of the shaft 29 may also apply to Examples 2 to 4.

In Example 5, the advantageous effect similar to that obtained with Example 1 may be obtained. It is also possible to reduce the hysteresis produced when the inertial body 30 be pre-compressed in the axial direction in assembling.

Example 6

A damper device according to Example 6 of the present invention will now be described with reference to the drawings. FIG. 17 depicts a radial partial cross-sectional view schematically showing the configuration of a damper device according to Example 6 of the present invention.

Example 6 is a modification of Example 5. In Example 6, a Belleville spring 81 is provided between the plate 31 of the inertial body 30 and an end on an axially one side of the hub part 28a of the hub member 28. Otherwise, the subject Example is similar to Example 1.

The Belleville spring 81 is an annular saucer-like elastic (resilient) member, and preferably is formed of metal in view of durable life. The Belleville spring 81 is spline-engaged at its inner rim end with the outer splines 29a of the shaft 29 (for preventing rotation). The Belleville spring 80 is retained at its inner rim end by the end part on an axially one side of the hub part 28a of the hub member 28, while biasing, at its outer rim end, the plate 31 of the inertial body 30 towards the planetary gear mechanism (4 of FIG. 1), that is, towards the right-hand side of FIG. 17.

It is observed that an arrangement of Example 6 in which the Belleville spring 81 is disposed between the inertial body 30 and the end part on one axial side of the hub part 28a of the hub member 28 may also apply to Examples 2 to 4.

In Example 6, the advantageous effect similar to that obtained with Example 5 may be obtained.

The particular exemplary embodiments or examples may be modified or adjusted within the scope of the entire disclosure of the present invention, inclusive of claims, based on the fundamental technical concept of the invention. Moreover, a variety of combinations or selection of elements disclosed herein may be made within the context of the claims. That is, the present invention may cover a wide variety of variations or modifications that may occur to those skilled in the art in accordance with the entire disclosure of the present invention, inclusive of claim and the technical concept of the present invention.

The invention claimed is:

1. A damper device comprising:
a first shaft that outputs rotational power of a power source;
a second shaft that transmits the rotational power to a gear mechanism and includes outer splines;
a first rotational member(s) to which the rotational power of the first shaft is transmitted;
a second rotational member connected by splined engagement with the outer splines;
a damper unit that absorbs torque fluctuations between the first rotational member(s) and the second rotational member;
an inertial body having inner splines for connection by splined engagement with the outer splines and having a substantially annular portion; wherein tooth parts of one of the outer splines and the inner splines are pressure-contacted with tooth parts of the other of the inner splines and the outer splines, in a circumferential direction of the inertial body; and wherein the inertial body includes, as the inner splines, first inner splines connected by splined engagement with the outer splines and second inner splines connected by splined engagement with the outer splines at a location spaced a pre-set distance from the first inner splines in an axial direction of the second shaft;

the tooth parts of the first inner splines being phase-shifted relative to the tooth parts of the second inner splines; and the tooth parts of the outer splines being pressure-contacted with the tooth parts of the first inner splines and the tooth parts of the second inner splines in the circumferential direction of the inertial body.

2. The damper device according to claim 1, wherein the inertial body includes:
a first plate extending from the annular portion towards an inner rim part and having the first inner splines at an inner rim end thereof;
a second plate extending from the annular portion towards the inner rim part and having the second inner splines at the inner rim end; and
a rivet(s) that connects the first and second plates together.

3. The damper device according to claim 2, wherein at least one out of the first and second plates is formed by a plate member and includes a plurality of slits.

4. The damper device according to claim 1, wherein the inertial body is formed by a single member and includes a first inner rim extension(s) and a second inner rim extension(s) extending from the inner rim end of the annular portion;
the first inner rim extension(s) including the first inner splines at an inner rim end thereof;
the second inner rim extension(s) including the second inner splines at an inner rim end thereof.

5. The damper device according to claim 4, wherein the inertial body includes radially extending slit(s) circumferentially between the first and second inner rim extensions.

6. The damper device according to claim 5, wherein at least one out of the first inner rim extension(s) and the second inner rim extension(s) includes a plurality of radially extending second slits.

7. The damper device according to claim 4, wherein at least one out of the first inner rim extension(s) and the second inner rim extension(s) includes a plurality of radially extending second slits.

8. The damper device according to claim 1, wherein the second shaft has a stepped sidewall section at retracted ends of the outer splines;
one of the first inner splines and the second inner splines being pressure-contacted with the stepped sidewall section;
the other of the first inner splines and the second inner splines being pressure-contacted with the second rotational member.

9. The damper device according to claim 1, wherein the second shaft has a stepped sidewall section at retracted ends of the outer splines; the damper device further comprising:
a resilient member of metal disposed between one of the first inner splines and the second inner splines and the stepped sidewall section; the resilient member biasing said one of the first inner splines and the second inner splines towards the second rotational member;
the other one of the first inner splines and the second inner splines being pressure-contacted with the second rotational member.

10. The damper device according to claim 1, wherein the second shaft has a stepped sidewall section at retracted ends of the outer splines; the damper device further comprising:
a resilient member of metal disposed between one of the first inner splines and the second inner splines and the second rotational member; the resilient member biasing said one of the first inner splines and the second inner splines towards the stepped sidewall section;
the other one of the first inner splines or the second inner splines being pressure-contacted with the stepped sidewall section.

11. A damper device comprising:
a first shaft that outputs rotational power of a power source;
a second shaft that transmits the rotational power to a gear mechanism and includes outer splines;
a first rotational member(s) to which the rotational power of the first shaft is transmitted;
a second rotational member connected by splined engagement with the outer splines;
a damper unit that absorbs torque fluctuations between the first rotational member(s) and the second rotational member;
an inertial body having inner splines for connection by splined engagement with the outer splines and having a substantially annular portion; wherein
tooth parts of one of the outer splines and the inner splines are pressure-contacted with tooth parts of the other of the inner splines and the outer splines, in a circumferential direction of the inertial body; and
wherein the inertial body includes, as the inner splines, first inner splines connected by splined engagement with the outer splines and second inner splines press-fitted to the outer splines at a location spaced a pre-set distance from the first inner splines in the axial direction of the second shaft; and
the tooth parts of the second inner splines being pressure-contacted to the tooth parts of the outer splines in the circumferential direction of the inertial body.

12. The damper device according to claim 11, wherein the second inner splines are disposed closer to the foremost part of the second shaft than the first inner splines.

13. The damper device according to claim 11, wherein the inertial body includes:
a first plate extending from the annular portion towards an inner rim part and having the first inner splines at an inner rim end thereof;
a second plate extending from the annular portion towards the inner rim part and having the second inner splines at the inner rim end; and
a rivet(s) that connects the first and second plates together.

14. The damper device according to claim 11, wherein the inertial body is formed by a single member and includes a first inner rim extension(s) and a second inner rim extension(s) extending from the inner rim end of the annular portion;
the first inner rim extension(s) including the first inner splines at an inner rim end thereof;
the second inner rim extension(s) including the second inner splines at an inner rim end thereof.

15. The damper device according to claim 11, wherein the second shaft has a stepped sidewall section at retracted ends of the outer splines;

one of the first inner splines and the second inner splines being pressure-contacted with the stepped sidewall section;

the other of the first inner splines and the second inner splines being pressure-contacted with the second rotational member.

16. The damper device according to claim 11, wherein the second shaft has a stepped sidewall section at retracted ends of the outer splines; the damper device further comprising:

a resilient member of metal disposed between one of the first inner splines and the second inner splines and the stepped sidewall section; the resilient member biasing said one of the first inner splines and the second inner splines towards the second rotational member;

the other one of the first inner splines and the second inner splines being pressure-contacted with the second rotational member.

17. The damper device according to claim 11, wherein the second shaft has a stepped sidewall section at retracted ends of the outer splines; the damper device further comprising:

a resilient member of metal disposed between one of the first inner splines and the second inner splines and the second rotational member; the resilient member biasing said one of the first inner splines and the second inner splines towards the stepped sidewall section;

the other one of the first inner splines or the second inner splines being pressure-contacted with the stepped sidewall section.

18. A damper device, comprising:

a first shaft that outputs rotational power of a power source;

a second shaft that transmits the rotational power to a gear mechanism and includes outer splines;

a first rotational member(s) to which the rotational power of the first shaft is transmitted;

a second rotational member connected by splined engagement with the outer splines;

a damper unit that absorbs torque fluctuations between the first rotational member(s) and the second rotational member; and an inertial body having inner splines for connection by splined engagement with the outer splines and having a substantially annular portion; wherein tooth parts of one of the outer splines and the inner splines are pressure-contacted with tooth parts of the other of the inner splines and the outer splines, in a circumferential direction of the inertial body, and in the circumferential direction of the inertial body, tooth parts of one of the outer splines of the second shaft and the inner splines of the inertial body clamp the tooth parts of the other one of the splines from both sides thereof along the circumferential direction.

* * * * *